(12) United States Patent
Gottmann et al.

(10) Patent No.: US 9,142,845 B2
(45) Date of Patent: Sep. 22, 2015

(54) SOLID OXIDE FUEL CELL STACK HEAT TREATMENT METHODS AND APPARATUS

(71) Applicant: Bloom Energy Corporation, Sunnyvale, CA (US)

(72) Inventors: Matthias Gottmann, Sunnyvale, CA (US); Stephen Couse, Sunnyvale, CA (US); James McElroy, Suffield, CT (US); Ryan Hallum, Mountain View, CA (US); Jakob Hilton, Sunnyvale, CA (US); Kurt Risic, Mountain View, CA (US); Ram Ramanan, San Jose, CA (US); Michael Gasda, Mountain View, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 315 days.

(21) Appl. No.: 13/768,218

(22) Filed: Feb. 15, 2013

(65) Prior Publication Data

US 2013/0252119 A1   Sep. 26, 2013

Related U.S. Application Data

(60) Provisional application No. 61/600,102, filed on Feb. 17, 2012.

(51) Int. Cl.
| | |
|---|---|
| *H01M 8/00* | (2006.01) |
| *H01M 8/04* | (2006.01) |
| *H01M 8/02* | (2006.01) |
| *H01M 8/12* | (2006.01) |

(52) U.S. Cl.
CPC ............ *H01M 8/04097* (2013.01); *H01M 8/00* (2013.01); *H01M 8/04022* (2013.01); *H01M 8/04067* (2013.01); *H01M 8/04373* (2013.01); *H01M 2008/1293* (2013.01); *Y02E 60/50* (2013.01); *Y02E 60/525* (2013.01)

(58) Field of Classification Search
CPC ..... H01M 8/00; H01M 8/04; H01M 8/04097; H01M 8/04022; H01M 8/04373; H01M 8/0467
See application file for complete search history.

(56) References Cited

U.S. PATENT DOCUMENTS

| | | | |
|---|---|---|---|
| 5,795,146 | A | 8/1998 | Orbeck |
| 6,013,385 | A * | 1/2000 | DuBose ........................ 429/410 |
| 6,693,263 | B2 | 2/2004 | Nishimura |
| 7,425,692 | B2 | 9/2008 | Orbeck et al. |
| 7,955,450 | B2 | 6/2011 | Mahlo et al. |
| 2004/0173608 | A1 | 9/2004 | Seccombe, Jr. et al. |
| 2004/0191584 | A1* | 9/2004 | Rice et al. ........................ 429/13 |

(Continued)

OTHER PUBLICATIONS

International search report and written opinion received in connection with International Application No. PCT/US2013/026387, mailed Jun. 17, 2013.

(Continued)

*Primary Examiner* — Kenneth Douyette
(74) *Attorney, Agent, or Firm* — The Marbury Law Group PLLC

(57) ABSTRACT

Systems and methods are provided for fuel cell stack heat treatment. An eductor may be used to recycle air into the air inlet stream or to recycle fuel into the fuel inlet stream. An eductor may also be used to exhaust air away from the furnace. The stack heat treatment may include stack sintering or conditioning. The conditioning may be conducted without using externally supplied hydrogen.

24 Claims, 19 Drawing Sheets

(56) References Cited

U.S. PATENT DOCUMENTS

2006/0051715 A1* 3/2006 Orbeck et al. ................. 431/116
2006/0169639 A1* 8/2006 Duraiswamy et al. ........ 210/640
2007/0012184 A1* 1/2007 Duraiswamy et al. ............ 95/54
2010/0193742 A1* 8/2010 Oettinger ...................... 252/373
2011/0008700 A1* 1/2011 Patel et al. .................... 429/455

OTHER PUBLICATIONS

International Preliminary Report on Patentability received in connection with International Application No. PCT/US2013/026387, mailed Aug. 28, 2014.

* cited by examiner

SOLID OXIDE FUEL CELL STACK HEAT TREATMENT METHODS AND APPARATUS

RELATED APPLICATIONS

This application claims the benefit of priority of U.S. Provisional Patent Application No. 61/600,102 filed Feb. 17, 2012, entitled "Solid Oxide Fuel Cell Stack Heat Treatment Methods and Apparatus", the entire contents of which are incorporated by reference herein.

BACKGROUND

The present invention relates generally to the field of fuel cell fabrication and more particularly to fuel cell stack sintering and conditioning methods and apparatus.

Solid oxide fuel cells ("SOFC's") are solid-state devices which use an oxygen ion conducting ceramic electrolyte to produce electrical current by transferring oxygen ions from an oxidizing gas stream at the cathode of the fuel cell to a reducing gas stream at the anode of the fuel cell. The oxidizing flow is typically air, while the fuel flow may be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. The stacks are often internally manifolded for fuel and/or air flow, and the ceramic electrolyte material may include internal openings or holes to accommodate fluid flow within the stack.

Fuel cell stack fabrication may require sintering of the fuel cells and separate conditioning of the fuel cells. During fuel cell stack sintering and conditioning the appropriate environment should be provided in the anode and cathode of the fuel cells. Previously, blowers and mass flow controllers have regulated the process gas flows from external gas supplies to the cell anode and cathode electrodes and the process gases have been exhausted after they pass through the fuel cell stack. Gas pre-heaters and heating coils have been used to regulate the heat input into the anode and cathode process gases. During the conditioning of fuel cell stacks, hydrogen from on-site generation or from off-site delivery is used to characterize the fuel cell stacks.

The fabrication of fuel cell stacks may involve a large number of complex process steps. Each process step needs to be carefully designed and process interactions considered in order to create a functioning product with high yield. In the fabrication process the fuel cell stacks and components may go through several thermal processes. The thermal gradients in those components can cause failures such as cracks or warping resulting in bad fuel cell stacks. Previous process controls have been implemented at the end user level. If a bad fuel cell stack was received by the end user, then the fabrication process was changed. If a good fuel cell stack was received by the end user, then the fabrication process continued unchanged. The previous process controls were slow to respond to problems, expensive, and did not increase fuel cell stack quality.

SUMMARY

The embodiments of the invention provide systems and methods for fuel cell stack heat treatment. In one aspect of the invention, an eductor is used to recycle air into the air inlet stream. In another aspect of the invention, an eductor is used to recycle fuel into the fuel inlet stream. In another aspect of the invention, an eductor is used to exhaust air away from the furnace. In another aspect of the invention, a hydrogen separator is used to recycle hydrogen to the fuel inlet stream.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
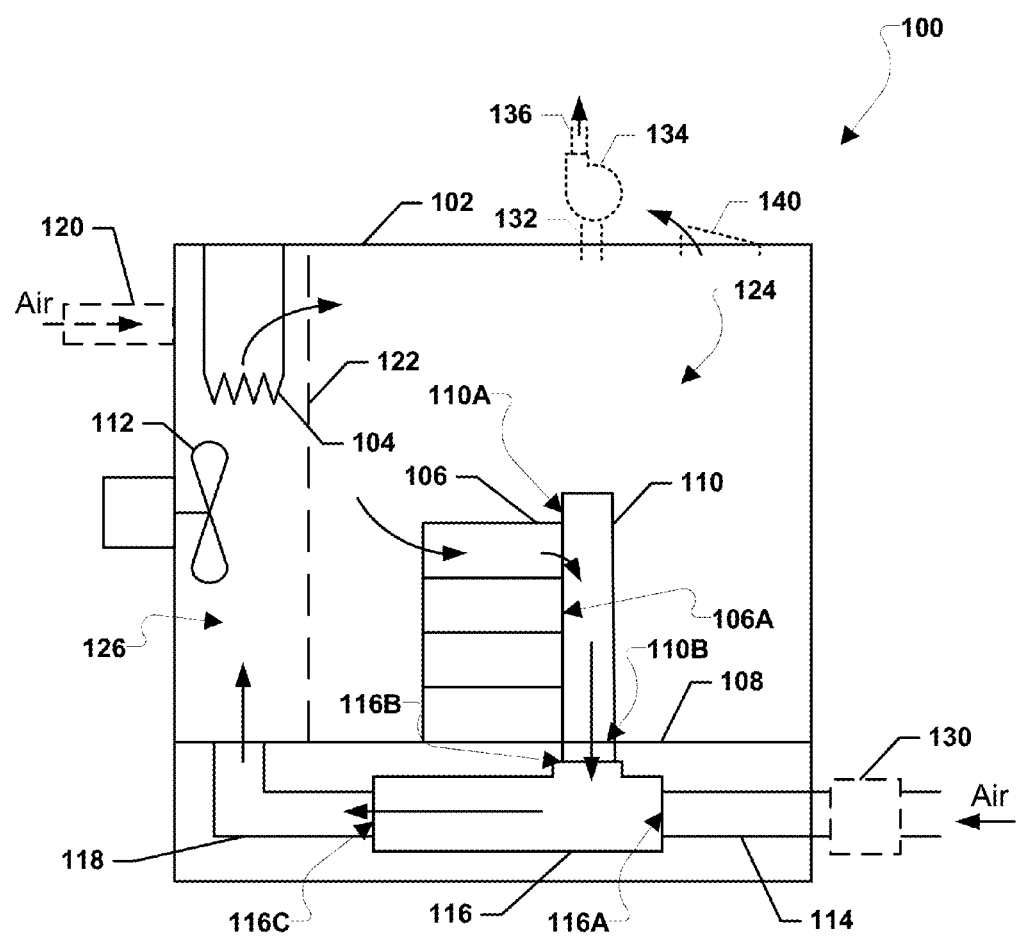
FIG. 1A is a schematic side cross sectional view of a furnace for heating a fuel cell stack according to an embodiment of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments of the invention provide systems and methods for fuel cell stack heat treatment. In one aspect of the invention, an eductor is used to recycle air into the air inlet stream. In another aspect of the invention, an eductor is used to recycle fuel into the fuel inlet stream. In another aspect of the invention, an eductor is used to exhaust air away from the furnace. In another aspect of the invention, a hydrogen separator is used to recycle hydrogen to the fuel inlet stream. The various embodiments may improve the ability to identify known failure modes and higher sensitivity to known failure modes may enable tighter specification on performance, better performance of the fuel cell stacks in the field, and less chance of passing a bad fuel cell stack from production.

For purposes of this application "sintering" includes processes for heating, melting, and/or reflowing glass or glass-ceramic seal precursor material(s), such as glass or glass-ceramic forming powders and/or glass or glass-ceramic layers in the stack to form the glass or glass-ceramic seals between a fuel cell and two adjacent interconnects in the stack. Sintering may be performed at temperatures greater than 600 degrees Celsius, such as 600-1000 degrees Celsius, including 700-800 degrees Celsius, 800-900 degrees Celsius, 700-900 degrees Celsius, 900-950 degrees Celsius, and/or 950-1000 degrees Celsius.

For purposes of this application "conditioning" includes processes in which the fuel cell (e.g., SOFC) stack may be operated for the first time. Preferably power is drawn and/or applied to the stack during conditioning. Conditioning may include processes for heat up of the fuel cell stack at a controlled rate, reducing a metal oxide (e.g., nickel oxide) in an anode electrode to a metal (e.g., nickel) in a cermet electrode (e.g., Ni-zirconia electrode, such as Ni-yttria stabilized zirconia and/or Ni-scandia stabilized zirconia electrode, or Ni-doped ceria (e.g., scandia doped ceria) anode), testing or characterizing the stack during operation, and/or controlled cool down. Conditioning may be performed at temperatures from 600-900 degrees Celsius, such as 800-850 degrees Celsius, and may be performed with fuel and air flowing to anodes and cathodes. Conditioning may be utilized to reduce the anode, characterize the anode, electrically characterize each cell, and/or screen out stacks with known failure modes (e.g., cracked cells, leaking seals, poor fuel utilization, and/or uneven flow distribution). During conditioning reduction of the anode may be performed with hydrogen or without hydrogen in an electrochemical process (e.g., electrochemical reduction (ECR)). During conditioning characterization for fuel utilization and cracks may be performed with hydrogen or without hydrogen.

The sintering and conditioning processes may be conducted independently, in succession, or in any order. Preferably, the sintering and conditioning is performed on a fuel cell (e.g., SOFC) stack which is supported on the same support structure during both sintering and conditioning. These steps may be performed in a furnace, in the fuel cell system hot box, or in a different location. Additionally, the sintering and/or conditioning processes may be optional and not required for any given fuel cell stack. "Firing" includes processes for burnout and sintering of the electrolyte substrate of the fuel cell stacks.

FIG. 1A illustrates a furnace 100 according to one embodiment of the present invention. Preferably, the furnace 100 is a high temperature furnace suitable for use in the manufacture of fuel cell stacks, such as SOFC stacks, for example for conditioning of the stacks when air and fuel are provided to the respective cathode and anode cell electrodes in the stack.

The furnace 100 may be comprised of a hot zone 102 which is an area of the furnace 100 which is heated by the heat source 104 of the furnace 100. The heat source 104 may be any apparatus or system that provides heat, such as a resistive heater, burner, inductive heat coil, microwave source, heat lamp, etc. The hot zone 102 of the furnace 100 may have an air supply conduit 114, an eductor 116, and an air input conduit 118. While discussed mainly with reference to providing air, air input conduit 118 may be configured to provide air and/or other process gases into the furnace 100. A circulation fan 112 may be disposed within the hot zone 102 to circulate air. In an optional embodiment, the furnace 100 may also be provided with an auxiliary air supply conduit 120. A base 108 may be contained at the bottom of the furnace 100 hot zone 102. The base 108 may be configured to support one or more fuel cell stacks 106. The base 108 may be configured to support a fuel cell stack 106 at any angle. The fuel cell stack 106 may be supported by the base 108 in a vertical configuration, or a horizontal configuration. Alternatively, the base 108 may support the fuel cell stack 106 at an angle, such as 0-90 degrees, such as 45 degrees. The fuel cell stack 106 may be built from a multiplicity of fuel cells in the form of planar elements, tubes, or other geometries, separated by interconnects, such as plate shaped interconnects. Fuel cell stack 106 may contain seals between adjacent cells and interconnect surfaces to contain and direct fuel and air flows at various locations within the fuel cell stack 106 (e.g., air flow between the cathode and adjacent interconnect and fuel flow between the anode and adjacent interconnect). The fuel cell stack 106 may be internally or externally manifolded for fuel and/or air flow, and the cell ceramic electrolyte material and the interconnects may include air and fuel riser openings or holes to accommodate internal fluid flow within the fuel cell stack 106.

The furnace 100 may contain an optional permeable barrier 122 which may separate an air heating chamber 126 from the furnace 100 working area 124. The barrier 122 may allow air to move freely from the air heating chamber 126 to the working area 124. The furnace 100 may contain an air manifold or "bucket" 110 configured to remove air from the fuel cell stack 106. The fuel cell stack 106 may be placed on the base 108 of the furnace 100 such that the air bucket 110 may fluidly connect to an air outlet of the fuel cell stack 106 and air exhausted from the fuel cell stack 106 may enter the air bucket 110. For example, for externally manifolded for air fuel cell stacks, the back side 106A of the fuel cell stack 106 may be open to allow air exhaust to exit into an open front side 110A of the air bucket 110. The air supply conduit 114 may be coupled to a motive inlet 116A of the eductor 116. The eductor 116 may be any type eductor, for example a Venturi eductor. The eductor 116 may be constructed from any material, such as a high temperature material. As an example, the eductor 116 may be made from ceramics, such as Alumina, or high temperature alloys, such as Inconel 600. The air bucket 110 outlet opening 110B in its bottom surface may be coupled to a suction inlet 116B of the eductor 116. The air input conduit 118 may be coupled to a discharge outlet 116C of the eductor 116. Air input conduit 118 enters the air heating chamber 126 near circulation fan 112 from the base 108.

Additionally, the furnace 100 may contain various sensors and controllers. Sensors may include, air/fuel flow monitors, furnace power monitors, temperature monitors (e.g., thermocouples), stack displacement monitors, current monitors, voltage monitors, and sulfur monitors. Controllers may receive inputs from the various monitors and control the operation of the various components of the furnace 100 to control the overall operation of the furnace. Additionally, the collection of statistical data from the monitors and recordation of the input and output parameters may improve product quality and yield during the fuel cell stack 106 manufacturing process. In an optional embodiment, an optional blower/fan and filter unit 130 may be coupled to air supply conduit 114. The optional blower/fan and filter unit 130 may blow air into air supply conduit 114, and/or may filter air entering the air supply conduit 114. In an additional optional embodiment, an optional blower/fan and filter unit 130 may be coupled to the auxiliary air supply conduit 120. In an additional optional embodiment, flaps to control the flow of air may be coupled to air supply conduit 114 and/or auxiliary air supply conduit 120. In a further optional embodiment, blowers/fans, filters, and flaps may be individually coupled to air supply conduit 114 and/or auxiliary air supply conduit 120. In another optional embodiment, an air pump 134 may be coupled to an optional air exhaust conduit 132. The optional air pump 134 may draw air from the working area 124 via the optional air exhaust conduit 132 and pump the air into an optional air exhaust conduit 136. In this manner, air and/or other organics may be pulled from the working area 124, such as during debindering of the fuel cell stack 106. In another optional embodiment, an optional hatch 140 in the furnace 100 may enable air to pass from the working area 124 out of the furnace 100. The optional hatch 140 may be any type opening, such as a flapper valve, manually operated hatch, and or a remotely operated hatch triggered by a pressure transducer. In an embodiment, the opening of the optional hatch 140 may let air out of the furnace 100 and may be used to regulate the pressure within the furnace 100.

Figure 1B:
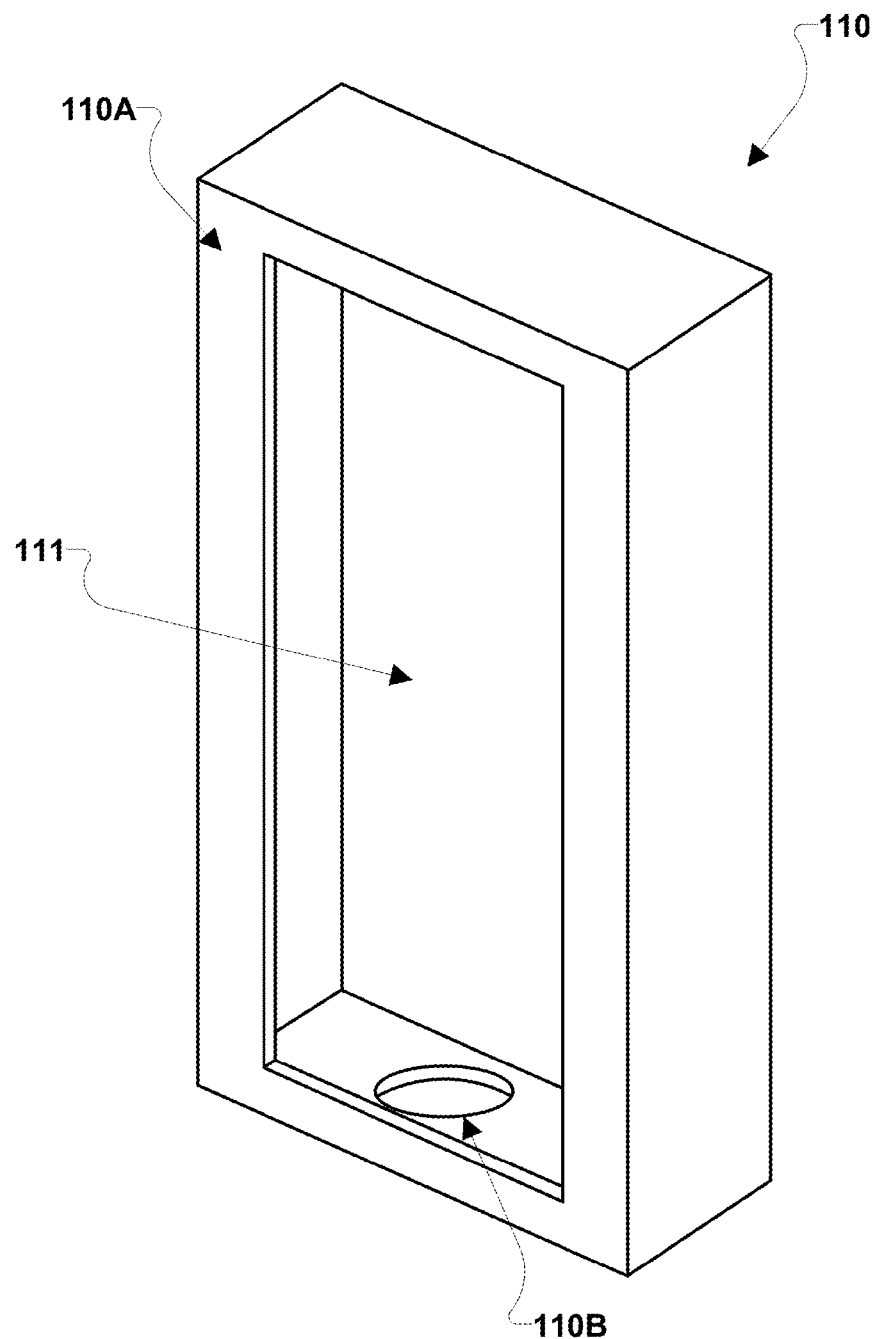
FIG. 1B is a schematic front/left side perspective view of an air bucket suitable for use with furnaces for heating a fuel cell stack according to embodiments of the present invention.

FIG. 1B illustrates the air bucket 110 of the furnace 100. The air manifold or "bucket" 110 may be configured to remove air from the fuel cell stack 106. Air exhausted from the fuel cell stack 106 may exit into an opening 111 on the front side 110A of the air bucket 110. The air entering the air bucket 110 from the opening 111 may pass through the air bucket 110 to the outlet opening 110B in the bottom surface of the air bucket 110. The outlet opening 110B may be coupled to a suction inlet 116B of the eductor 116.

Figure 1C:
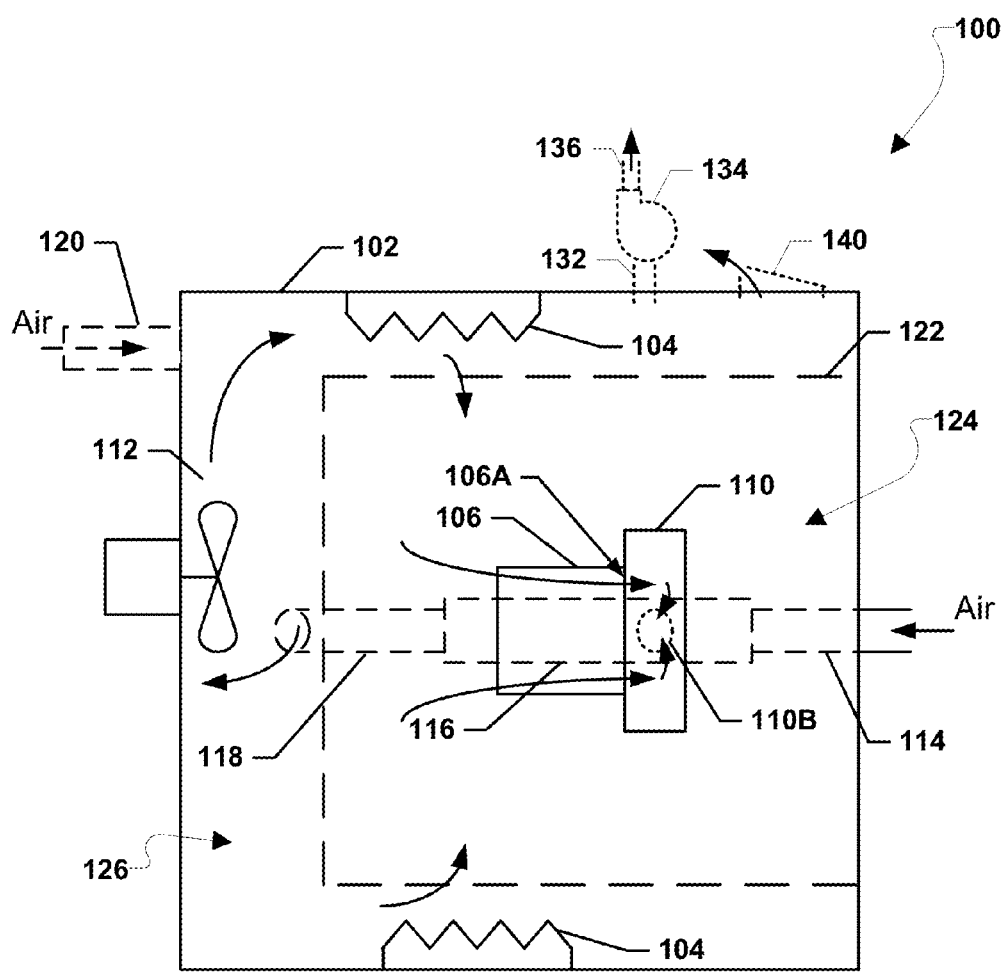
FIG. 1C is a schematic top view of a furnace for heating a fuel cell stack according to an embodiment of the present invention.

FIG. 1C illustrates a top view of furnace 100. FIG. 1C illustrates an embodiment of the present invention in which a single fuel cell stack 106 is positioned in the working area 124 of the furnace 100.

Figure 5:
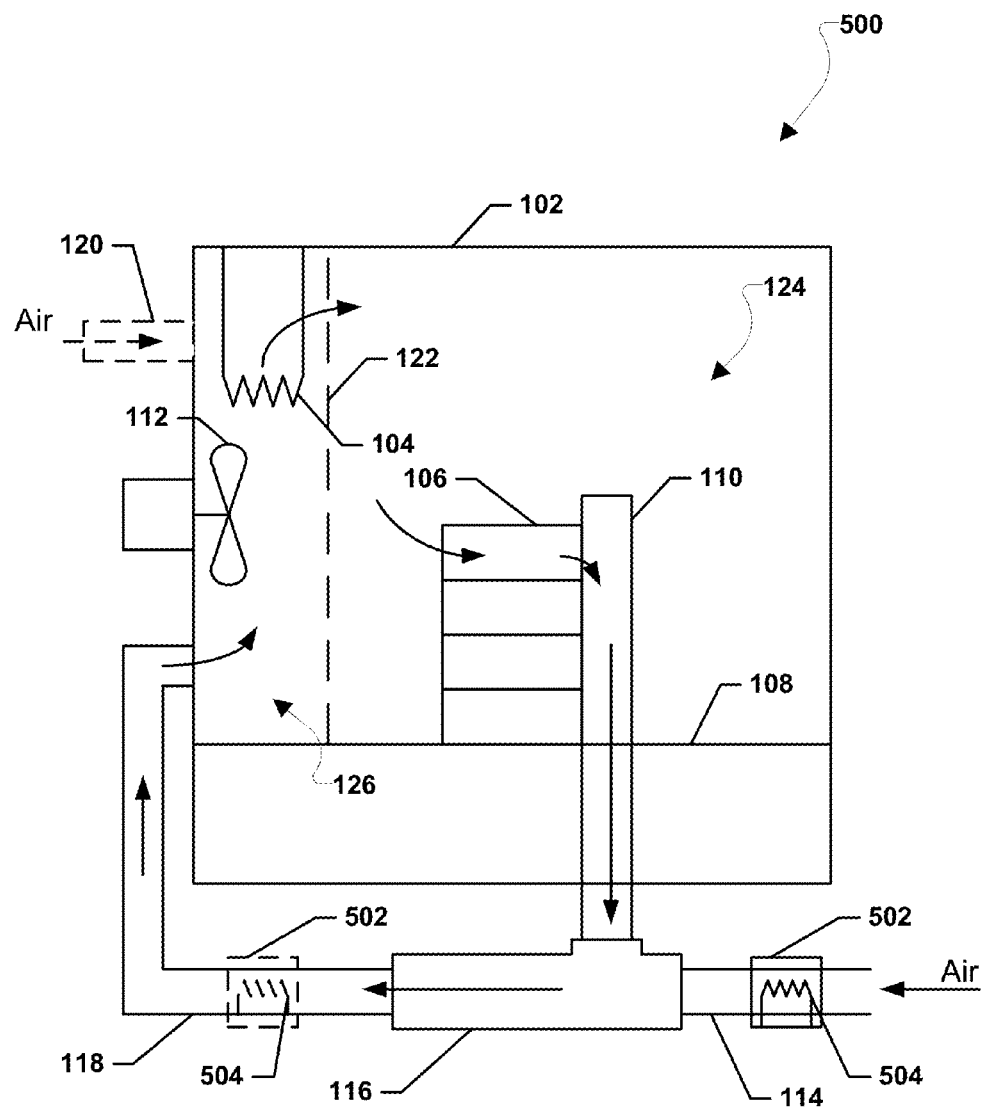

The furnace 100 may operate as follows. A fuel cell stack 106 may be placed on the base 108 of the furnace 100 such that air exhausted from the fuel cell stack 106 may be received by the air bucket 110. Air may be supplied to the furnace 100 via the air supply conduit 114. Air supplied via the air supply conduit may be supplied at a high pressure, for example 100-1000 standard liters per minute ("slm"), such as 760 slm, by an air blower or fan. Alternatively, air supplied via the air supply conduit may be supplied at a pressure greater than 760 slm, or lower than 760 slm, such as at 150 slm. The pressure and flow rate of the air flow supplied via the air supply conduit may be varied to adjust the flow rate of air provided to the fuel cell stack 106. Air supplied via the air supply conduit 114 may be at any temperature, for example 20 degrees Celsius to 730 degrees Celsius. Alternatively, air supplied via the air supply conduit 114 may be at a temperature below 20 degrees Celsius or above 730 degrees Celsius. In an embodiment, if the temperature of the air supplied via the air supply conduit 114 is less than 25 degrees Celsius, the air may be pre-heated by an air pre-heater as shown in FIG. 5. Air supplied via the air supply conduit 114 may enter a motive inlet 116A of the eductor 116 and pass out a discharge outlet 116C of the eductor into the air input conduit 118. The air input conduit 118 may provide the air to the air heating chamber 126. At start-up of the furnace 100, the air from the air input conduit 118 may be at the same temperature and pressure as the air supplied to the air supply conduit 114 because the furnace 100 has not started to heat the hot zone 102. In an optional embodiment, air provided to the furnace 100 from the auxiliary air supply conduit 120 may have the same characteristics as air provided from the air supply conduit 114 and/or air input conduit 118. In an additional optional embodiment, air provided to the furnace 100 from the auxiliary air supply conduit 120 may have different characteristics as air provided from the air supply conduit 114 and/or air input conduit 118, such as a lower temperature to act as cooling air for the furnace 100.

The heat source 104 may heat air within the air heating chamber 126. As an example, the heat source 104 may heat the air to 500-800 degrees Celsius, for example 730-750 degrees Celsius, such as 730 degrees Celsius. Alternatively, the heat source may heat the air to more than 800 degrees Celsius, or less than 500 degrees Celsius. The circulation fan 112 may aid in circulation of the air from the air heating chamber 126 through the barrier 122 to the working area 124. The heated air may pass through the externally manifolded for air fuel cell stack 106 and be exhausted to the air bucket 110. If the fuel cell stack 106 is operating to generate electricity (e.g., during conditioning) then it may generate heat for further heating the air in the fuel cell stack 106 and the working area 124. As an example, the fuel cell stack 106 may heat the air in the fuel cell stack 106 and the working area 124 adjacent to the fuel cell stack 106 to 750-900 degrees Celsius, for example 825-850 degrees Celsius. Alternatively, operation of the fuel cell stack 106 may heat the air in the working area 124 to greater than 900 degrees Celsius or less than 750 degrees Celsius. The heated air exhausted from the fuel cell stack 106 may enter the air bucket 110 via opening 111 in the front side 110A of the air bucket 110 and then exit the air bucket 110 via outlet opening 110B and enter the eductor 116 via a suction inlet 116B of the eductor 116. The air entering the eductor 116 via suction inlet 116B from the air bucket 110 may have a lower pressure than the air supplied to the eductor 116 via motive inlet 116A from the air supply conduit 114. The higher pressure air from the supply conduit 114 may serve to pull the lower pressure, higher temperature air from the air bucket 110 via the eductor 116 and the two air streams may mix in the eductor 116 and be discharged as a single stream from the discharge outlet of the eductor 116 into the air input conduit 118. In this manner at least a portion of the heated air from the working area 124 of the furnace 100 may be recycled into the heating chamber 126. Preferably, at least 80% of the air provided to the working area 124 may be recycled. Alternatively, more than 80% of the air may be recycled, such as 80% to 85%, 85% to 90%, 90% to 95%, or 95% to 100%, such as about 99% or about 100%. Alternatively, less than 80% of the air may be recycled, such as 80% to 60%, 60% to 40%, 40% to 20%, or 20% to 0%.

The recycling of already heated air may heat the air in the heating chamber 126 to the same temperature or a temperature closer to that in the working area 124. In this manner air entering the fuel cell stack 106 may be already heated to furnace 100 operating temperature, and thermal gradients that may damage fuel cell stack 106 components may be reduced or avoided on a stack and on a cell to cell level. Additionally, the recycling of air may aid in thermal management during the fuel cell stack 106 manufacturing process by enabling faster heat up and cool down cycle times and the recycling of air may reduce the energy used in each cycle to heat air and may place less wear on furnace 100 heating components. Further, the eductor 116 may be a passive device requiring less maintenance than other air control devices and less energy supplied to heater, and may enable a smaller heater to be used.

In an embodiment, the operation of furnace 100 may be controlled based on statistical data collected from various monitoring devices and sensors disposed in the furnace 100. A furnace power monitor may track the power consumption of the furnace 100. The utilization of a power monitor may enable furnace 100 failure modes to be detected, such as degradations in the furnace 100 heat source 104, degradations in heat exchange equipment or pre-heaters, degradation in recirculation equipment such as the circulation fan 112 and eductor 116, and/or thermally significant structural changes in the furnace 100. A temperature sensor in the recycle stream of the furnace 100 (e.g., in conduit 118) may monitor the temperature of the recycled air and/or process gas and may detect leakage in the recycling system. A stack displacement measuring device may be coupled to the fuel cell stack 106 and may monitor fuel cell stack 106 displacement/shrinkage during seal formation (e.g., during stack sintering) and throughout the entire manufacturing cycle. Statistical evaluation of fuel cell stack 106 shrinkage may provide quick feedback on temperature or seal irregularities. Exhaust gas monitoring may provide a health check on the integrity of the air flow paths. If the flow rates significantly increase or decrease temperature excursions may indicate the change. Additionally, cooling air supplied by the auxiliary air supply conduit 120 may be used to control the temperature of the furnace 100 and/or fuel cell stack 106.

Figure 2:
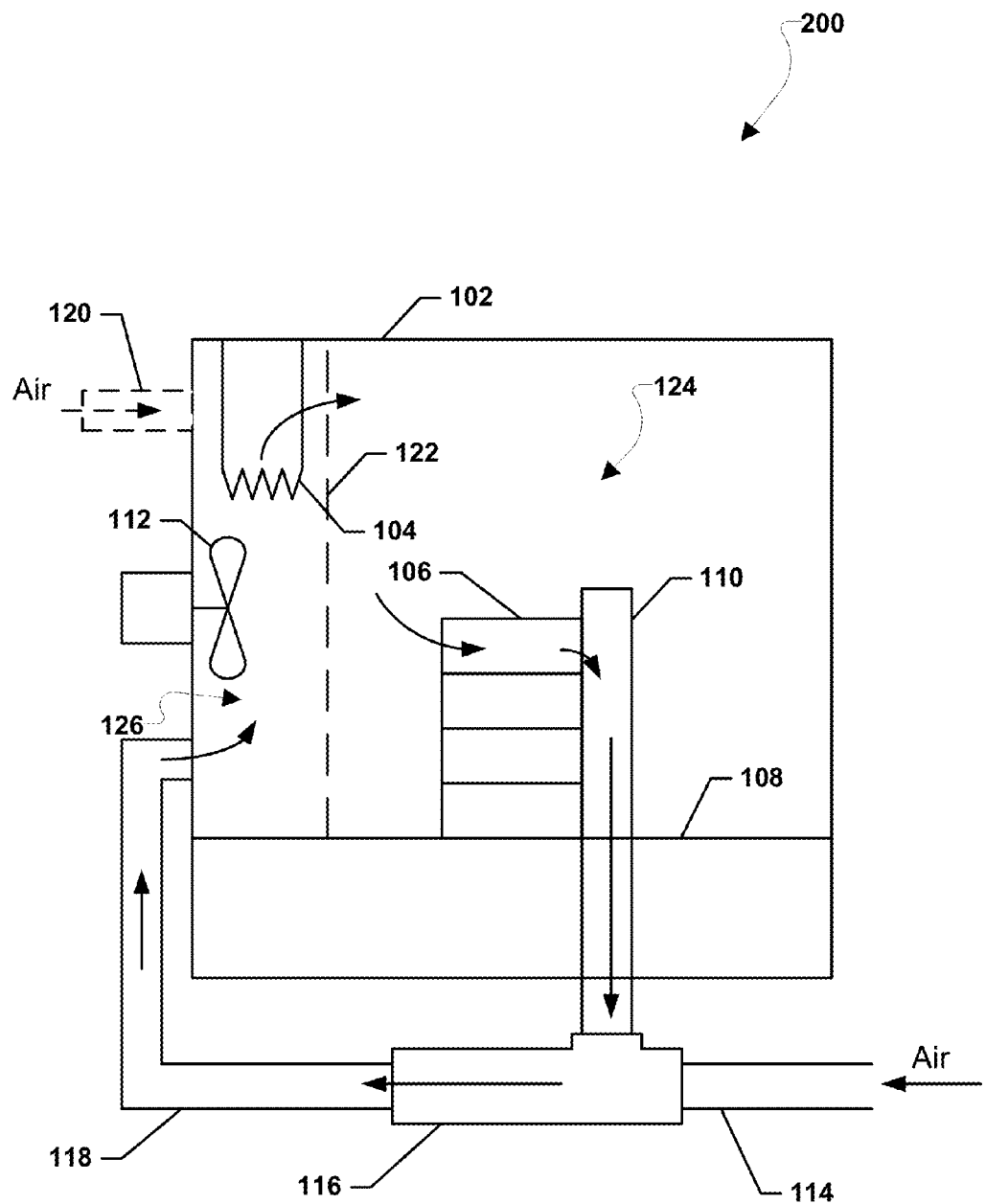
FIGS. 2-8 are side cross sectional views of furnaces for heating a fuel cell stack according to embodiments of the present invention.

FIG. 2 illustrates a furnace 200 according to another embodiment of the invention. The furnace 200 is similar to furnace 100 illustrated in FIG. 1A and contains a number of components in common. Those components which are common to both furnaces 100 and 200 are numbered with the same numbers in FIGS. 1A and 2 and will not be described further.

One difference between furnaces 100 and 200 is that in furnace 200, the eductor 116 may be outside the hot zone 102 of the furnace 200. Placement of the eductor 116 outside of the hot zone 102 may enable the eductor 116 to be made from materials not suitable for high temperature applications, and may result in cooling of the air from the air bucket 110 as it passes outside the hot zone 102. In furnace 200 the eductor 116 may be outside the base 108 as illustrated in FIG. 2, while in the furnace 100 the eductor 116 may be inside the base 108 as illustrated in FIG. 1A.

Figure 3:
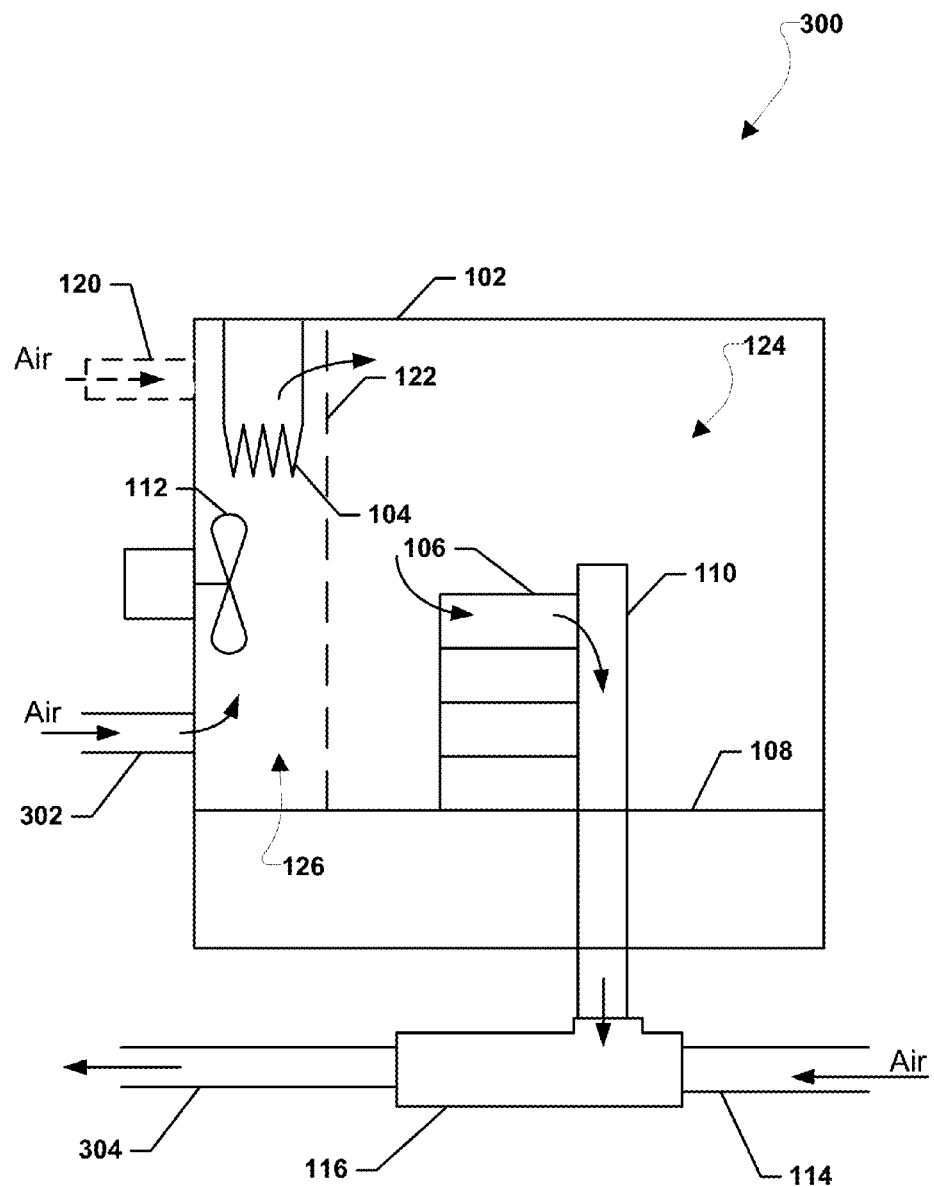

FIG. 3 illustrates a furnace 300 according to another embodiment of the invention. The furnace 300 is similar to furnace 100 illustrated in FIG. 1A and contains a number of components in common. Those components which are common to both furnaces 100 and 300 are numbered with the same numbers in FIGS. 1A and 3 and will not be described further.

One difference between furnaces 100 and 300 is that in furnace 300, the eductor 116 may be outside the hot zone 102 of the furnace 300. Another difference between the furnaces 100 and 300 is the addition of air input conduit 302 configured to supply air and/or process gas to the heating chamber 126 and the addition of air exhaust conduit 304 coupled to the discharge outlet of eductor 116.

In operation, furnace 300 may not recycle air, but rather may utilize the eductor 116 to draw and exhaust air away from the furnace 300. Air and/or process gases may be supplied to the heating chamber 126 of the furnace 300 via air input conduit 302. In an embodiment the air supplied via air inlet conduit 302 may be pre-heated air and the air supplied via the auxiliary air supply conduit 120 may be cooling air. The air supplied via air inlet conduit 302 may be low pressure air, or alternatively unpressurized air. As discussed above with reference to FIG. 1, the air may be heated by the heat source 104 and the circulation fan 112 may move the heated air through the barrier 122 to the working zone 124 of the furnace 300. High pressure air supplied to the furnace 300 via air input conduit 114 may enter the eductor 116 via a motive inlet of the eductor 116 and the movement of the high pressure air through the eductor 116 may draw air through the fuel cell stack 106 into the air bucket 110 and into the eductor 116 through a suction inlet of the eductor 116. The air from the air bucket 110 may mix with the air from air input conduit 114 and be discharged away from the furnace 300 via a discharge outlet of the eductor 116 to the air exhaust conduit 304. In this manner, the eductor 116 may act to move air through the furnace 300 via suction rather than pressurization. Additionally, the use of the eductor 116 to exhaust air from the system may reduce the complexity of the overall air control system and the eductor 116 is a passive device requiring less maintenance than other air control devices.

Figure 4:
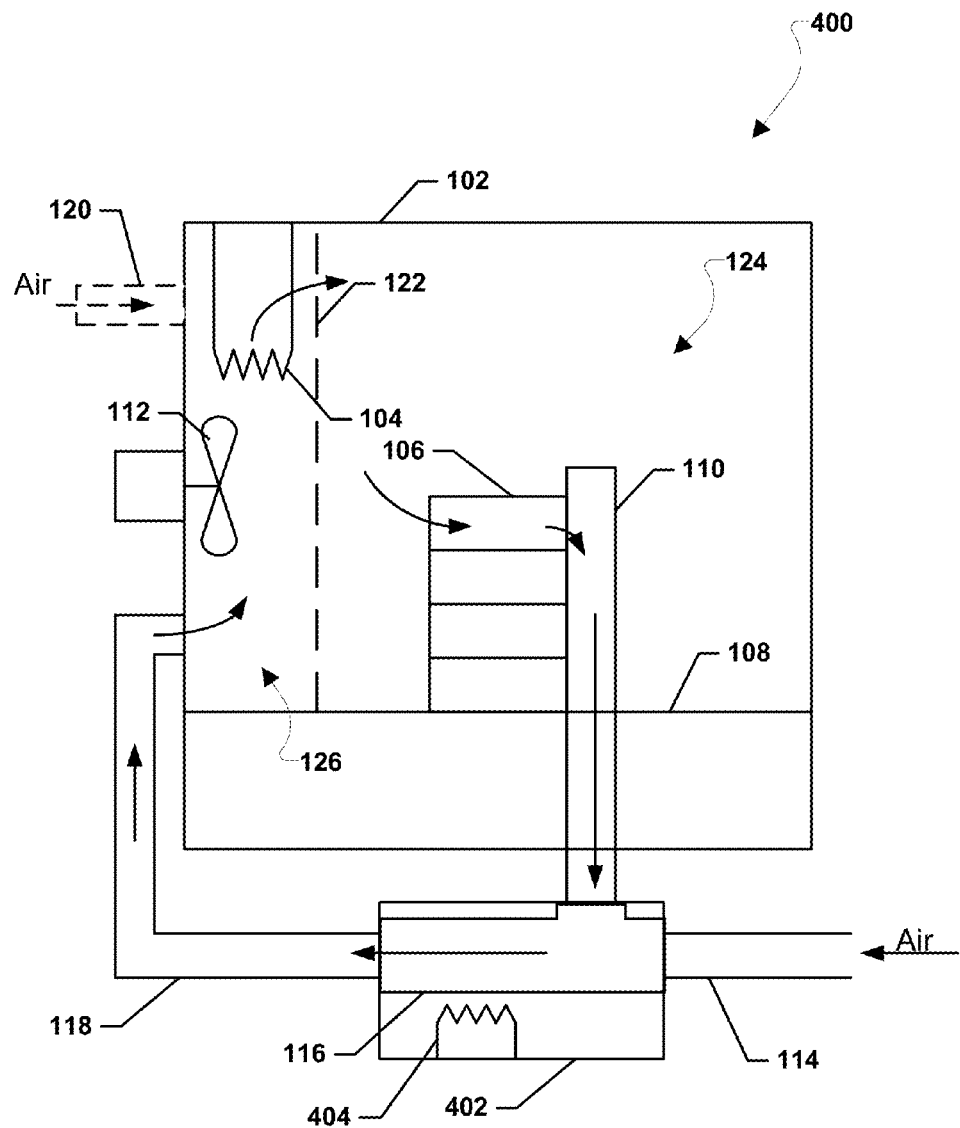

FIG. 4 illustrates a furnace 400 according to another embodiment of the invention. The furnace 400 is similar to furnace 200 illustrated in FIG. 2 and contains a number of components in common. Those components which are common to both furnaces 200 and 400 are numbered with the same numbers in FIGS. 2 and 4 and will not be described further.

One difference between furnace 400 and furnace 200 is that furnace 400 may include a heater 402 configured to heat the air inlet stream of the furnace 400. In an embodiment, the heater 402 may be a jacket heater coupled around the eductor 116. The heater 402 may contain a heat source 404 which may heat the eductor 116 and thereby the air moving through the eductor 116. The preheating of air may heat the air supplied to the heating chamber 126 to the same temperature or a temperature closer to that of the temperature in the working area 124. In this manner air entering the fuel cell stack 106 may be already heated to furnace 400 operating temperature. In this manner thermal gradients that may damage fuel cell stack 106 components may be reduced or avoided on a stack and on a cell to cell level. Additionally, the preheating of air may aid in thermal management during the fuel cell stack 106 manufacturing process by enabling faster heat up cycle times.

FIG. 5 illustrates a furnace 500 according to another embodiment of the invention. The furnace 500 is similar to furnace 200 illustrated in FIG. 2 and contains a number of components in common. Those components which are common to both furnaces 200 and 500 are numbered with the same numbers in FIGS. 2 and 5 and will not be described further.

One difference between the furnace 500 and the furnace 200 is that furnace 500 may include a pre-heater 502 configured to pre-heat the air inlet stream in air supply conduit 114 prior to the air input entering the motive inlet of the eductor 116. The pre-heater 502 may be coupled to the air input conduit 114 or disposed within the air input conduit 114. The pre-heater 502 may contain a heat source 504. In operation, the pre-heater 502 may pre-heat the air supplied to the furnace 500 by air input conduit 114 prior to the air entering the motive inlet of the eductor 116. The pre-heating of the air supplied to the furnace 500 may reduce the thermal gradients and may reduce thermal differences between the air entering the eductor 116 from the air input conduit 114 and the air entering the eductor 116 form the air bucket 110. In an alternative embodiment, pre-heater 502 may be coupled to the air input conduit 118 instead, or in addition, to being coupled to air supply conduit 114. In this manner, air may be heated after leaving the eductor 116.

Figure 6:
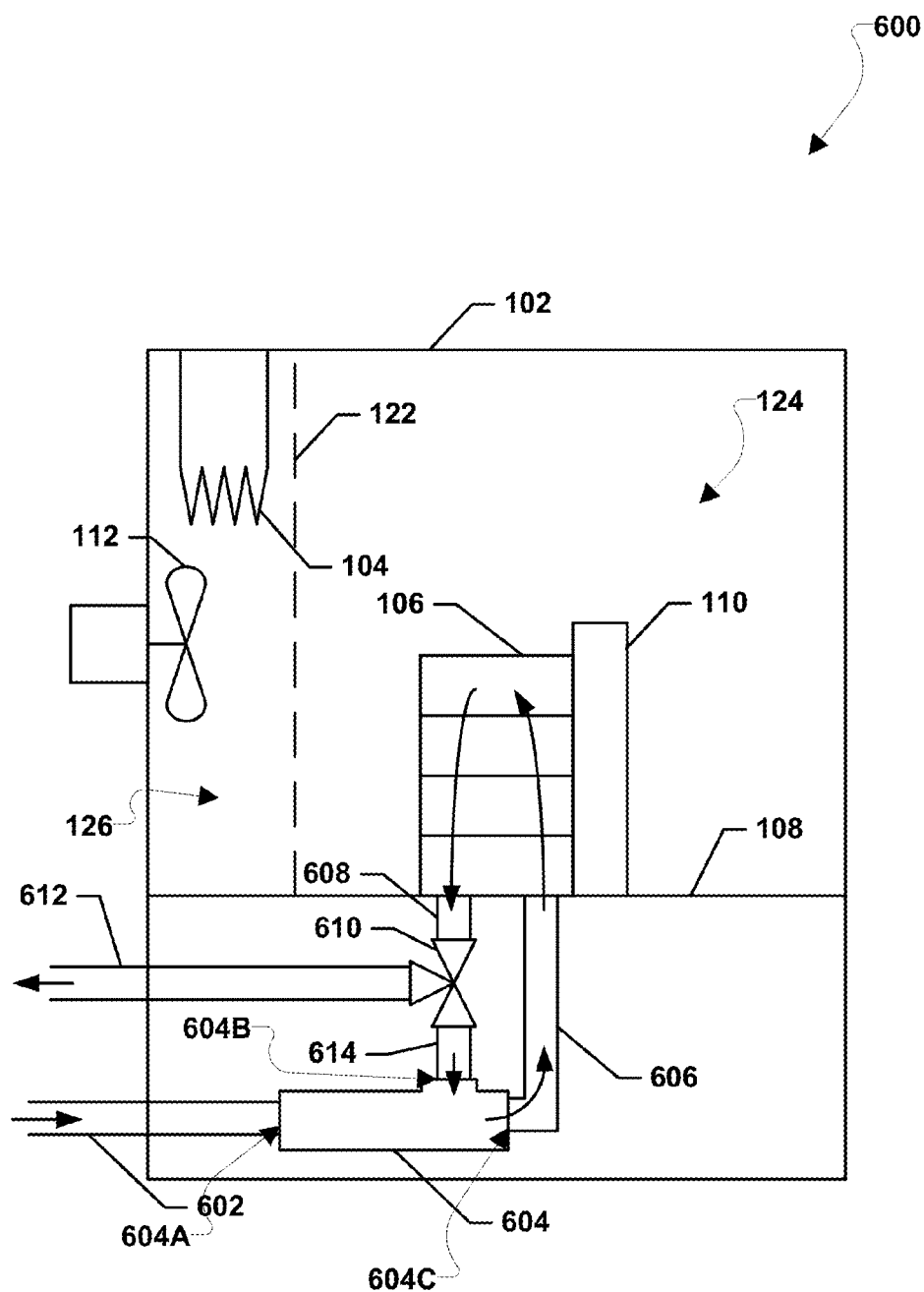

FIG. 6 illustrates a furnace 600 according to another embodiment of the invention. The furnace 600 is similar to furnace 100 illustrated in FIG. 1A and contains a number of components in common. Those components which are common to both furnaces 100 and 600 are numbered with the same numbers in FIGS. 1A and 6 and will not be described further.

One difference between furnace 100 and furnace 600 is that furnace 600 may include an eductor 604 located in the furnace 600 hot zone 102 configured to recycle a portion of the fuel exhaust from the fuel cell stack 106 into the fuel inlet stream. While furnace 600 is illustrated without an air system or eductor for an air system, one of ordinary skill in the art would understand that any of the embodiments of air eductors in any of the furnace air systems illustrated and discussed herein may be used in conjunction with fuel systems that employ eductors, such as eductor 604, according to any of the described embodiments to supply air and/or process gases to the furnace 600 and fuel cell stack 106. Fuel systems and air systems need not be exclusive of each other.

Furnace 600 may include a fuel supply conduit 602 for supplying fuel to the fuel cell stack 106 within the furnace 600. The fuel may comprise any suitable fuel, such as a hydrogen fuel or a hydrocarbon fuel, including but not limited to methane, natural gas which contains methane with hydrogen and other gases, propane or other biogas, or a mixture of carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel supply conduit may be coupled to a motive inlet 604A of the eductor 604. A fuel inlet conduit 606 may be coupled to a discharge outlet 604C of the eductor 604 such that fuel from the eductor 604 may be provided to the fuel cell stack 106 which may be manifolded, internally or externally, to receive and utilize the fuel. For example, the fuel cell stack 106 shown in FIG. 6 is internally manifolded for fuel. Once fuel and oxidant are provided into the fuel cell stack 106, the stack 106 may be operated to generate electricity, heat, and a fuel exhaust stream. The fuel exhaust stream may contain hydrogen, water vapor, carbon monoxide, carbon dioxide, some un-reacted hydrocarbon gas, such as methane, and other reaction by products and impurities.

A fuel exhaust conduit 608 may be coupled to the fuel cell stack 106 and may be configured to receive fuel exhaust from the fuel cell stack 106. The fuel exhaust conduit 608 may be coupled to an optional valve 610. As an example, valve 610 may be a three way valve. Alternatively, the valve 610 may be a splitter. One valve outlet of valve 610 may be coupled to a fuel exhaust conduit 612 configured to transport fuel exhaust away from the furnace 600. Another valve outlet of valve 610 may be coupled to a recycling conduit 614 configured to recycle a portion of the fuel exhaust to a suction inlet 604B of the eductor 604 and thereby back to the fuel cell stack 106. The portion of fuel exhaust recycle via recycling conduit 614 may vary and may be controlled by operation and/or construction of valve 610 and/or by construction of the eductor 604 or rate of supply of fuel via fuel supply conduit 602. For example 10% of the fuel exhaust may be exhausted away from the furnace 600 via exhaust conduit 612 and 90% recycled via recycling conduit 614. Alternatively, 50% of the fuel exhaust may be exhausted away from the furnace 600 and 50% of the fuel exhaust may be recycled. Additionally, 90% of the fuel exhaust or more may be exhausted while 10% or less is recycled. The eductor 604 may be made of a high temperature material, such as ceramics, such as Alumina, or high temperature alloys, such as Inconel 600.

In operation fuel may be provided into the furnace via fuel supply conduit 602. The fuel supplied to the furnace may be at a high pressure (e.g., provided by a blower). The fuel may enter the eductor 604 via a motive inlet 604A of the eductor 604 from the fuel supply conduit 602. The fuel may exit the eductor 604 via a discharge outlet 604C of the eductor 604 and be provided to the fuel cell stack 106 via fuel inlet conduit 606. Fuel exhaust may exit the fuel cell stack 106 via fuel exhaust conduit 608. The fuel exhaust may be at a higher temperature than the fuel supplied to the fuel cell stack 106. A portion of the fuel exhaust from the fuel exhaust conduit 608 may be exhausted away from the furnace 600 via fuel exhaust conduit 612. A portion of the fuel exhaust from the fuel exhaust conduit 608 may be recycled to the eductor 604 via recycling conduit 614. The recycled fuel exhaust may enter the eductor 604 via the suction inlet 604B of the eductor 604.

The recycled fuel exhaust entering the eductor 604 from the recycling conduit 614 may have a lower pressure than the fuel supplied to the eductor 604 from the fuel supply conduit 602. The higher pressure fuel from the fuel supply conduit 602 may serve to pull the lower pressure, higher temperature recycled fuel exhaust from the recycling conduit 614 and the two fuel streams may mix in the eductor 604 and be discharged as a single fuel stream from the discharge outlet 604C of the eductor 604 into the fuel inlet conduit 606. In this manner, a portion of the fuel exhaust may be recycled back to the fuel cell stack 106. Additionally, the recycling of fuel exhaust may serve to increase the fuel inlet stream temperature improving process efficiency and reducing thermal gradients that may cause fuel cell stack 106 damage. Recycling of fuel exhaust may result in a savings in the amount of fuel supplied to the fuel cell stack 106 and recycling may provide steam generated by the fuel cell stack 106 during operation (e.g., $H_2O$ steam generated due to the combination of oxygen and hydrogen from the fuel at the cell anodes) back into the fuel inlet stream which may reduce or eliminate fuel humidification needs for the furnace 600 fuel supply.

Figure 7:
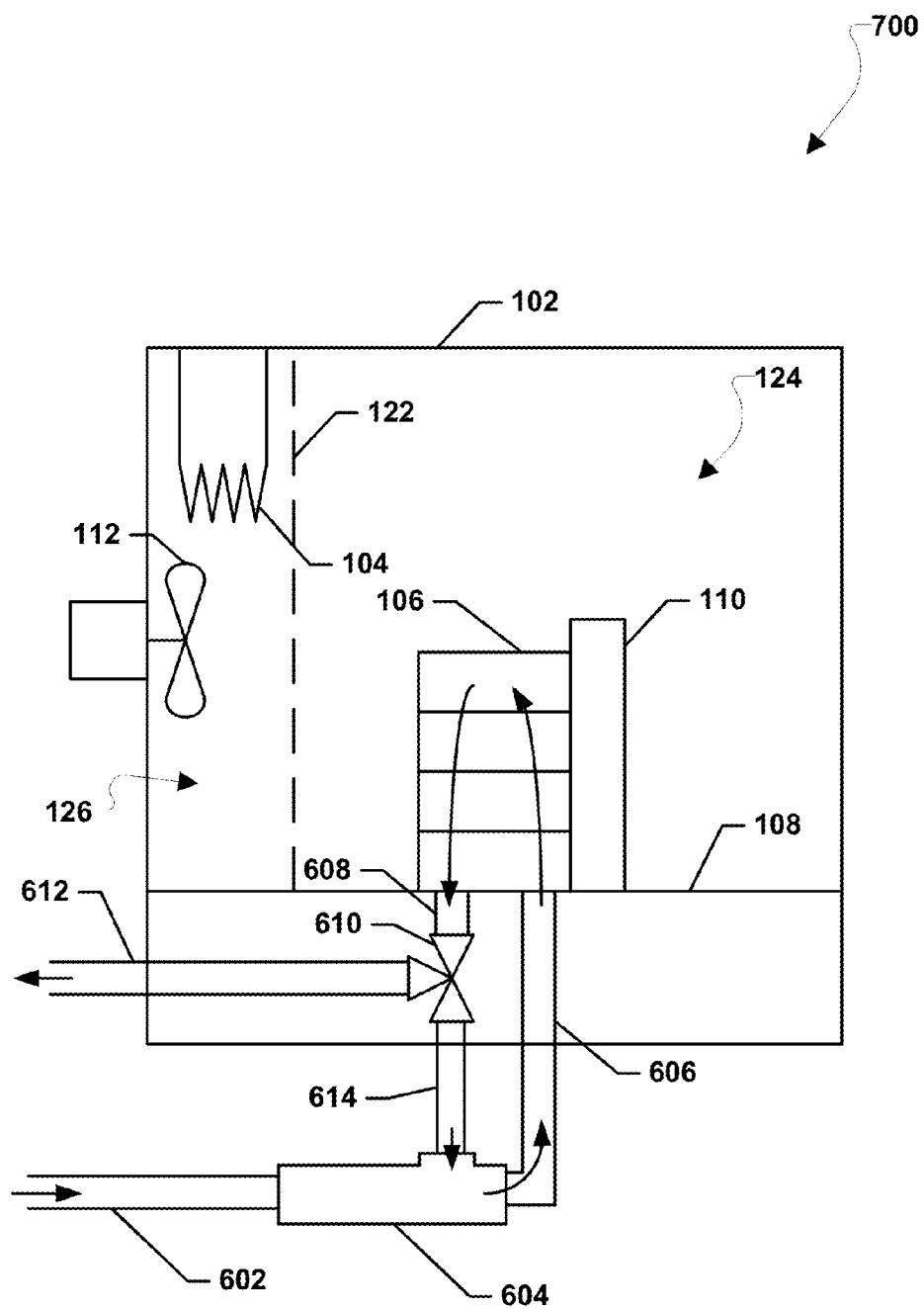

FIG. 7 illustrates a furnace 700 according to another embodiment of the invention. The furnace 700 is similar to furnace 600 illustrated in FIG. 6 and contains a number of components in common. Those components which are common to both furnaces 600 and 700 are numbered with the same numbers in FIGS. 6 and 7 and will not be described further.

One difference between furnaces 600 and 700 is that in furnace 700 the eductor 604 may be outside the hot zone 102 of the furnace 700. Placement of the eductor 604 outside of the hot zone 102 may enable the eductor 604 to be made from cheaper materials not suitable for high temperature applications, and may result in cooling of the recycled fuel exhaust in the recycling conduit 614 as it passes outside the hot zone 102. In furnace 700 the eductor 604 may be outside the base 108 as illustrated in FIG. 7, while in the furnace 600 the eductor 604 may be inside the base 108 as illustrated in FIG. 6.

Figure 8:
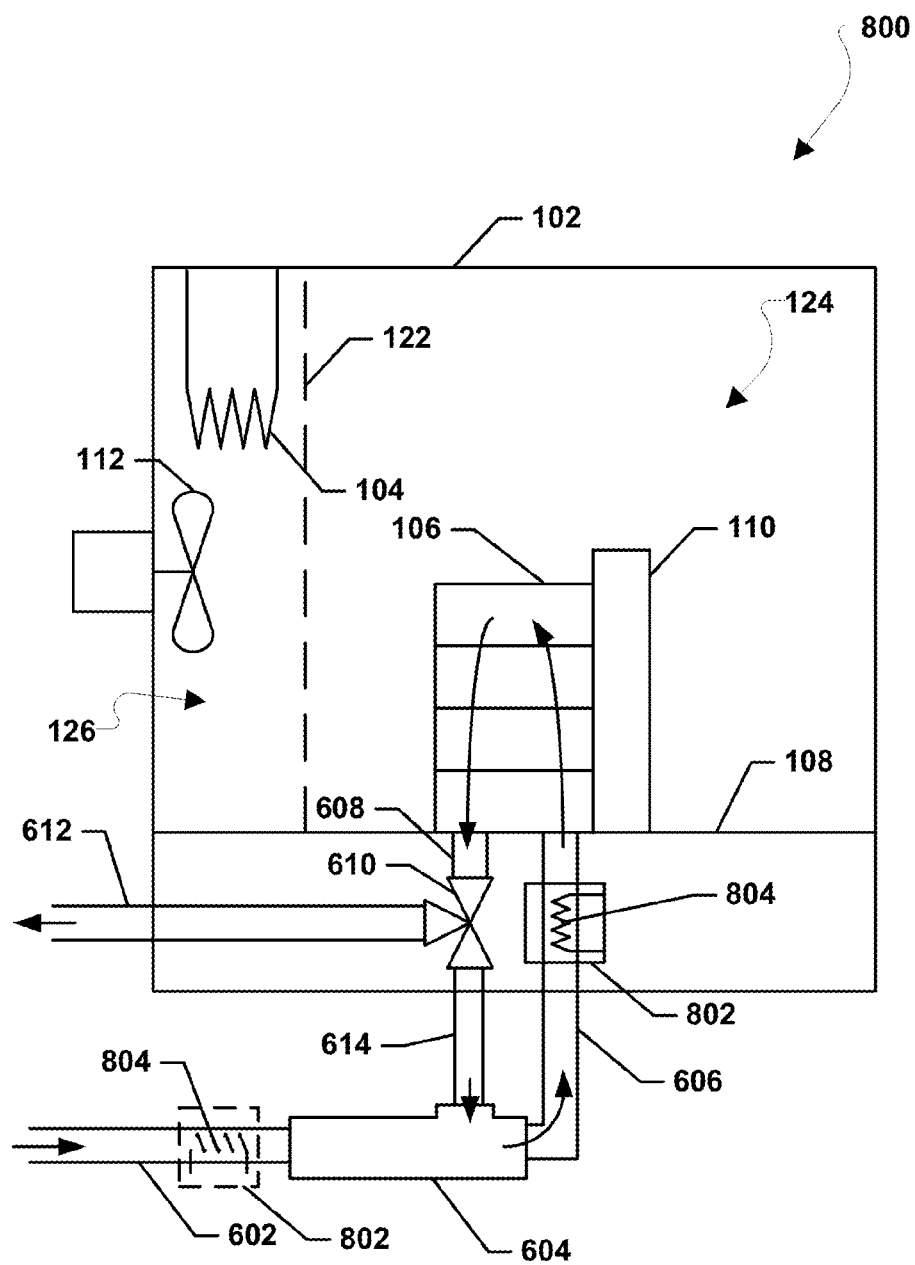

FIG. 8 illustrates a furnace 800 according to another embodiment of the invention. The furnace 800 is similar to furnace 700 illustrated in FIG. 7 and contains a number of components in common. Those components which are common to both furnaces 700 and 800 are numbered with the same numbers in FIGS. 7 and 8 and will not be described further.

One difference between furnace 800 and furnace 700 is that furnace 800 may contain a fuel preheater 802 to heat the fuel prior to the fuel entering the fuel cell stack 106. In an embodiment, the fuel preheater 802 may be coupled to the fuel inlet conduit 606. A heat source 804 of the fuel preheater 802 may be disposed within the fuel inlet conduit 606 to heat the fuel supplied to the fuel cell stack 106. Alternatively, the heat source 804 may simply be thermally coupled to the fuel inlet conduit 606. As an example, the fuel preheater 802 may be a jacket heater. The fuel preheater 802 may heat the fuel to a temperature closer to that of the operating temperature of the fuel cell stack 106. In this manner fuel entering the fuel cell stack 106 may be already heated to fuel cell stack 106 operating temperature. In this manner thermal gradients that may damage fuel cell stack 106 components may be avoided overall and on a cell to cell level. Additionally, the preheating of fuel may aid in thermal management during the fuel cell stack 106 manufacturing process by enabling faster heat up cycle times and by increasing the efficiency of the operation of the fuel cell stack 106. Alternatively, the fuel preheater 802 may be coupled to the fuel supply conduit 602 instead of, or in addition to, being coupled to the fuel inlet conduit 606. In this manner, fuel may be heated before entering the eductor 604.

Figure 9:
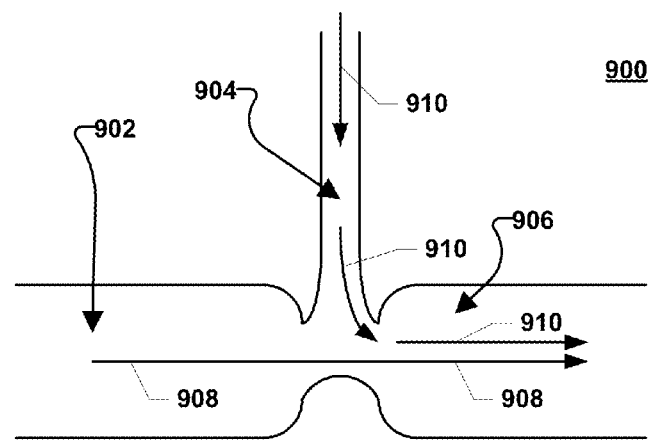
FIGS. 9-10 are respective side cross sectional and perspective schematics of eductors according to embodiments of the present invention.

FIG. 9 illustrates an embodiment Venturi eductor 900 suitable for use with the various embodiments of the invention. The Venturi eductor may comprise a motive inlet 902, a suction inlet 904, and a discharge outlet 906. The Venturi eductor 900 utilizes the Venturi effect to use the energy of a higher pressure motive fluid 908 passing through the Venturi eductor 900 from the motive inlet 902 to the discharge outlet 906 to draw a lower pressure fluid 910 through the suction inlet 904. The lower pressure fluid 910 is pulled through the suction inlet 904 where it mixes in the narrow converging area with the higher pressure fluid 908 from the motive inlet 902. The mixture of the two fluids 908 and 910 is then discharged from the Venturi eductor out the wider discharge outlet 906.

Figure 10:
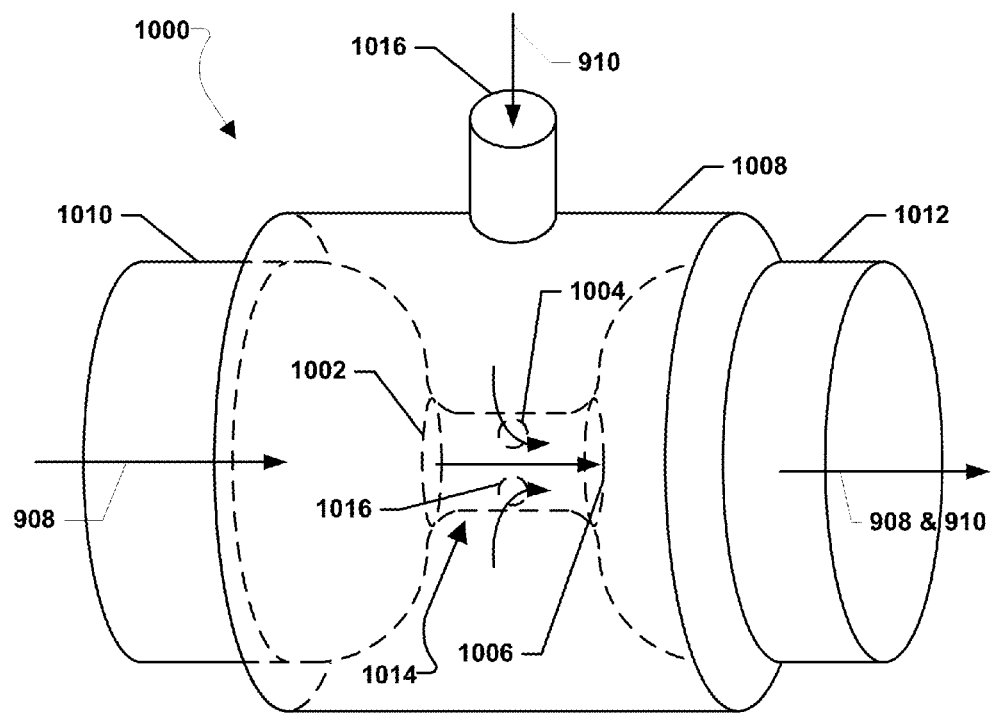

FIG. 10 illustrates an embodiment of an eductor 1000 suitable for use with the various embodiments of the invention (e.g., used for fuel and/or air mixing). A wider motive fluid conduit 1010 may provide a high pressure motive fluid 908 to a motive inlet 1002 of the eductor 1000 and into a narrower converging area 1014 of the eductor 1000. A recycle fluid conduit 1016 may provide low pressure suction fluid 910 to the eductor 1000. A jacket 1008 coupled to the fluid conduit 1010, fluid conduit 1016, and the wider discharge fluid conduit 1012 may receive the low pressure suction fluid 910 from the fluid conduit 1016. The low pressure suction fluid 910 may be drawn through the suction inlets 1004 from the jacket 1008 into the converging area 1014 and may mix with the high pressure motive fluid 908 in the converging area 1014. The mixture of the two fluids 908 and 910 may then pass out the discharge outlet 1006 of the eductor 1000 and into the wider discharge fluid conduit 1012.

Figure 11:
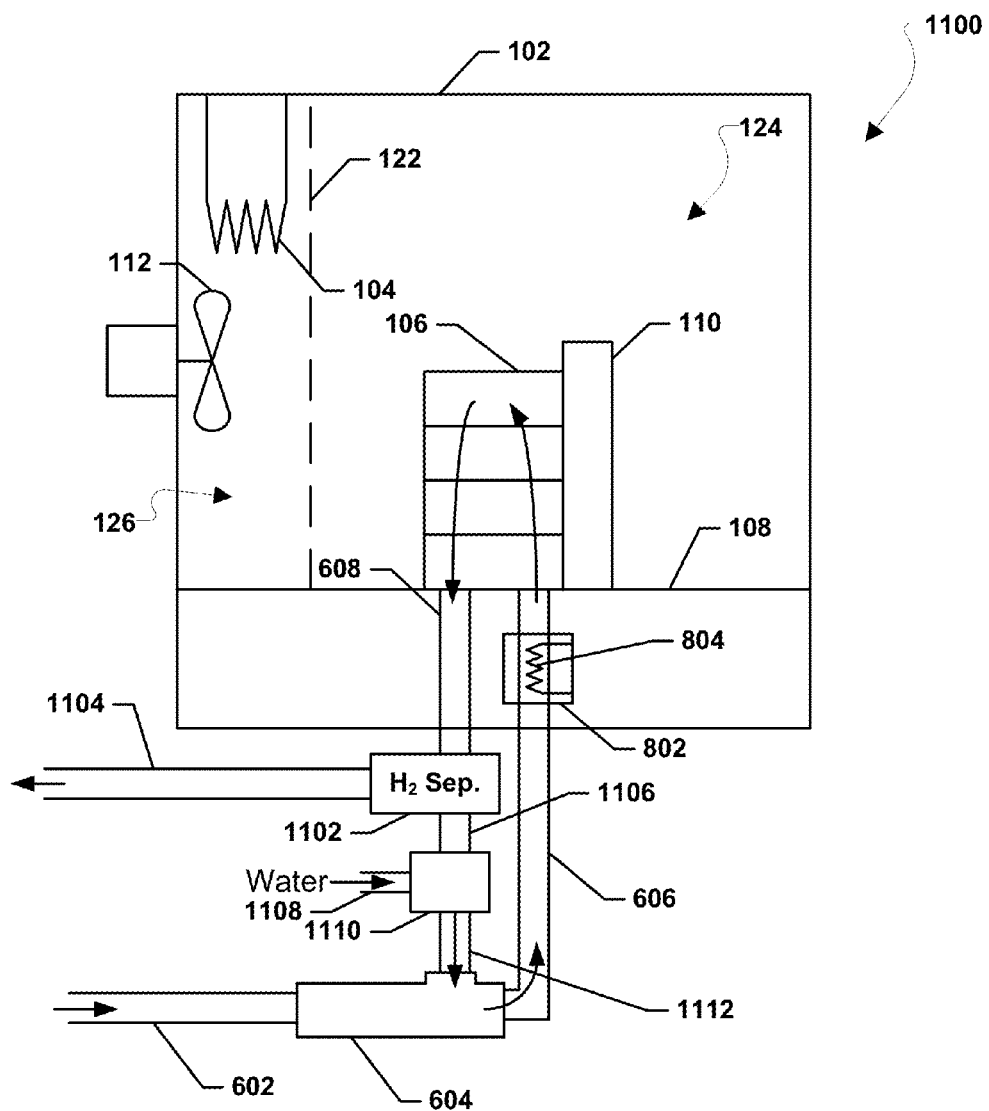
FIG. 11 is a schematic side cross sectional view of a furnace for heating a fuel cell stack according to an embodiment of the present invention.

FIG. 11 illustrates a furnace 1100 according to another embodiment of the invention. The furnace 1100 is similar to furnace 800 illustrated in FIG. 8 and contains a number of components in common. Those components which are common to both furnaces 800 and 1100 are numbered with the same numbers in FIGS. 8 and 11 and will not be described further.

A difference between furnace 800 and furnace 1100 is that furnace 1100 may include a hydrogen separator 1102 coupled to the fuel exhaust conduit 608 to separate a portion of hydrogen from the fuel exhaust stream and provide the separated hydrogen into the fuel inlet stream via the eductor 604. The hydrogen separator 1102 may be any type hydrogen separator, such as a low pressure separator (e.g., condenser) or a high pressure hydrogen separator (e.g., a cascaded electrochemical hydrogen pump separation unit which electrochemically separates hydrogen from the fuel exhaust stream as described in U.S. Patent Publication No. 2007/0178338, herein incorporated by reference in its entirety). The hydrogen separator 1102 may separate at least 95%, such as 95% to about 100% of the hydrogen contained in the fuel exhaust stream entering the hydrogen separator 1102 via fuel exhaust conduit 608. The remaining gases in the fuel exhaust stream may exit the hydrogen separator 1102 via fuel exhaust conduit 1104 and may be exhausted away from the furnace 1100. The separated hydrogen may exit the hydrogen separator 1102 via hydrogen conduit 1106 and may pass to an optional humidifier 1110. Optional humidifier 1110 may be any type humidifier, such as a spray humidifier, bubbler humidifier, steam injection humidifier, etc. Water or steam from water conduit 1108 may be provided to the humidifier 1110 from a water supply and a water and hydrogen mix may be passed from the humidifier 1110 to the suction inlet of the eductor 604 via hydrogen conduit 1112. The water and hydrogen mix may then be mixed with the fuel inlet stream in the eductor 604 and provided to the fuel cell stack 106. In this manner, separated hydrogen from the fuel exhaust generated during stack conditioning may be used to supplement the fuel inlet stream during conditioning reducing the amount of fuel to be used as well as to be stored or generated on site. Additionally, when the furnace is used during anode reduction type of conditioning only a small portion of the fuel stream may be oxidized, and recycling of unused hydrogen may be especially advantageous. Fuel used during characterization type of conditioning may be more oxidized than fuel used during anode reduction, but hydrogen reutilization may still be advantageous. The operation of the hydrogen separator 1102 may be controlled to increase or decrease the purity of the fuel recycled to the fuel cell stacks. Additionally, the humidifier 1110 may be controlled to add more, less, or no water to the fuel stream, thereby controlling the humidity of the fuel. In an optional embodiment, if the hydrogen separator 1102 is a high pressure hydrogen separator, then the eductor 604 may be omitted, and in this optional embodiment hydrogen conduit 1112 may recycle hydrogen into the fuel inlet stream without the need for the eductor 604.

Figure 12A:
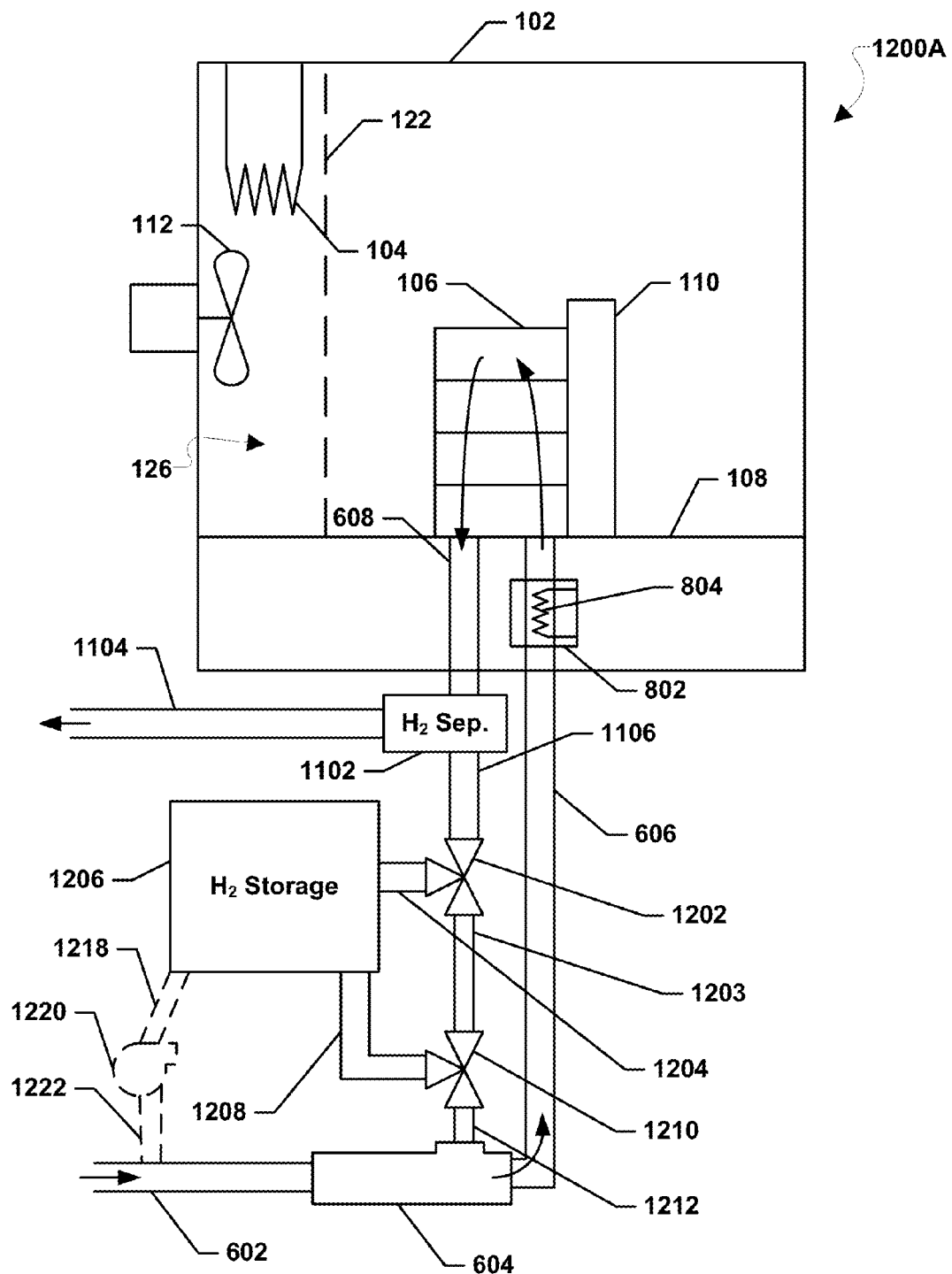
FIGS. 12A-C are schematic side cross sectional views of furnaces for heating a fuel cell stack according to embodiments of the present invention.

FIG. 12A illustrates a furnace 1200A according to another embodiment of the invention. The furnace 1200A is similar to furnace 1100 illustrated in FIG. 11 and contains a number of components in common. Those components which are common to both furnaces 1100 and 1200A are numbered with the same numbers in FIGS. 11 and 12A and will not be described further.

A difference between furnace 1100 and furnace 1200A is that furnace 1200A may include a hydrogen storage tank 1206 coupled to the hydrogen separator 1102 outlet 1106 and configured to store hydrogen received from the hydrogen separator 1102. As discussed above with reference to FIG. 11, separated hydrogen may exit the hydrogen separator 1102 via hydrogen conduit 1106. Hydrogen conduit 1106 may be coupled to an input of valve 1202. As an example valve 1202 may be a three-way valve. Valve 1202 outputs may be coupled to hydrogen conduits 1203 and 1204. Hydrogen conduit 1204 may be coupled to one valve 1202 output to hydrogen storage tank 1206. Hydrogen conduit 1203 may be coupled to one input of optional valve 1210. As an example valve 1210 may be a three-way valve. The hydrogen storage tank 1206 output may be coupled to hydrogen conduit 1208, and hydrogen conduit 1208 may be coupled to one of the inputs of valve 1210. The valve 1210 output may be coupled to hydrogen conduit 1212 which may be coupled to a suction inlet of the eductor 604.

In operation the hydrogen separator 1102 may separate hydrogen from the fuel exhaust stream and the separated hydrogen may pass via hydrogen conduit 1106 to the valve 1202. The operation of valve 1202 may be controlled by an operator of the furnace 1200A or a furnace 1200A controller to send the hydrogen to the hydrogen storage tank 1206 via hydrogen conduit 1204 and/or to send hydrogen to hydrogen conduit 1203. In this manner, all the separated hydrogen may be sent to storage, none of the separated hydrogen may be stored, or a percentage of the separated hydrogen may be stored and a percentage sent to hydrogen conduit 1203. Valve 1210 may be controlled to pass hydrogen from hydrogen conduit 1203 to hydrogen conduit 1212 and hydrogen conduit 1212 may pass the received hydrogen to a suction inlet of the eductor 604, thereby recycling hydrogen into the inlet fuel stream. Hydrogen sent to the hydrogen storage tank 1206 via hydrogen conduit 1204 may be stored for later use in the furnace 1200A. Valve 1210 may be controlled to allow hydrogen from hydrogen conduit 1208 to enter hydrogen conduit 1212 and thereby pass to a suction inlet of the eductor 604. In this manner, the higher pressure motive fuel through the eductor 604 may draw the lower pressure hydrogen from the hydrogen storage tank 1206 via hydrogen conduit 1208 and hydrogen conduit 1212 thereby utilizing the stored hydrogen in the fuel inlet stream which may reduce the need for additional hydrogen and reduce overall fuel consumption.

In an optional embodiment, a hydrogen conduit 1218 may be coupled to a hydrogen storage tank 1206 output and may provide hydrogen from the hydrogen storage tank to an input of a fuel blower 1220. An output of the fuel blower 1220 may be coupled to hydrogen conduit 1222 which may be coupled to fuel supply conduit 602. In operation the fuel blower 1220 may draw hydrogen from the fuel separator via hydrogen conduit 1218 and may blow hydrogen into the fuel supply conduit 602 via hydrogen conduit 1222 and thereby pass to a motive inlet of the eductor 604. The hydrogen blown into the fuel supply conduit 602 may be at a higher pressure than the hydrogen in hydrogen conduit 1212 and/or may eliminate the need to provide additional fuel to the fuel supply conduit 602, thereby enabling the furnace 1200A to operate on the stored hydrogen in the hydrogen storage tank 1206 without an external fuel input.

Figure 12B:
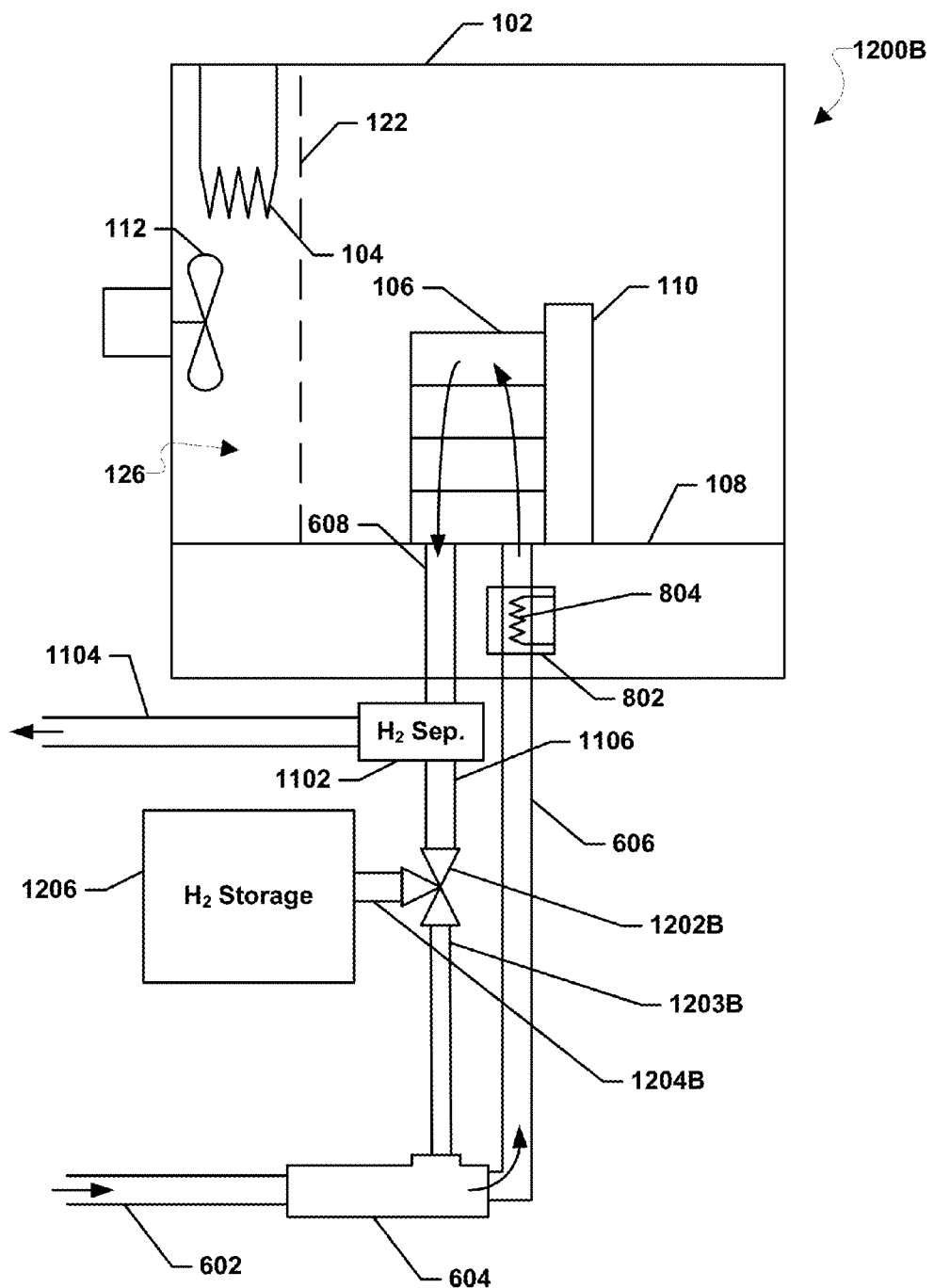

FIG. 12B illustrates a furnace 1200B according to another embodiment of the invention. The furnace 1200B is similar to furnace 1200A illustrated in FIG. 12A and contains a number of components in common. Those components which are common to both furnaces 1200A and 1200B are numbered with the same numbers in FIGS. 12A and 12B and will not be described further.

A difference between furnace 1200A and furnace 1200B is that in furnace 1200B the valve 1210 may be eliminated. Hydrogen conduit 1106 may be coupled to an input of valve 1202B. As an example valve 1202B may be a three-way valve. Valve 1202B outputs may be coupled to hydrogen conduits 1203B and 1204B. Hydrogen conduit 1204B may be coupled to one valve 1202B output and to hydrogen storage tank 1206. Hydrogen conduit 1203B may be coupled to one valve 1202B output and to a suction inlet of the eductor 604.

In operation the hydrogen separator 1102 may separate hydrogen from the fuel exhaust stream and the separated hydrogen may pass via hydrogen conduit 1106 to the valve 1202B. The operation of valve 1202B may be controlled by an operator of the furnace 1200B or a furnace 1200B controller to send the hydrogen to the hydrogen storage tank 1206 via hydrogen conduit 1204B and/or to send hydrogen to hydrogen conduit 1203B. In this manner, all the separated hydrogen may be sent to storage, none of the separated hydrogen may be stored, or a percentage of the separated hydrogen may be stored and a percentage sent to hydrogen conduit 1203B. Valve 1202B may be controlled to pass hydrogen to hydrogen conduit 1203B and hydrogen conduit 1203B may pass the received hydrogen to a suction inlet of the eductor 604, thereby recycling hydrogen into the inlet fuel stream. Hydrogen sent to the hydrogen storage tank 1206 via hydrogen conduit 1204B may be stored for later use in the furnace 1200B. Additionally, the operation of valve 1202B may be controlled to receive hydrogen from the hydrogen storage tank 1206 via hydrogen conduit 1204B and send the hydrogen received from hydrogen conduit 1204B to hydrogen conduit 1203B. In this manner, the higher pressure motive fuel through the eductor 604 may draw the lower pressure hydrogen from the hydrogen storage tank 1206 via hydrogen conduits 1204B, 1203B, and valve 1202B thereby utilizing the stored hydrogen in the fuel inlet stream which may reduce the need for additional hydrogen and reduce overall fuel consumption.

Figure 12C:
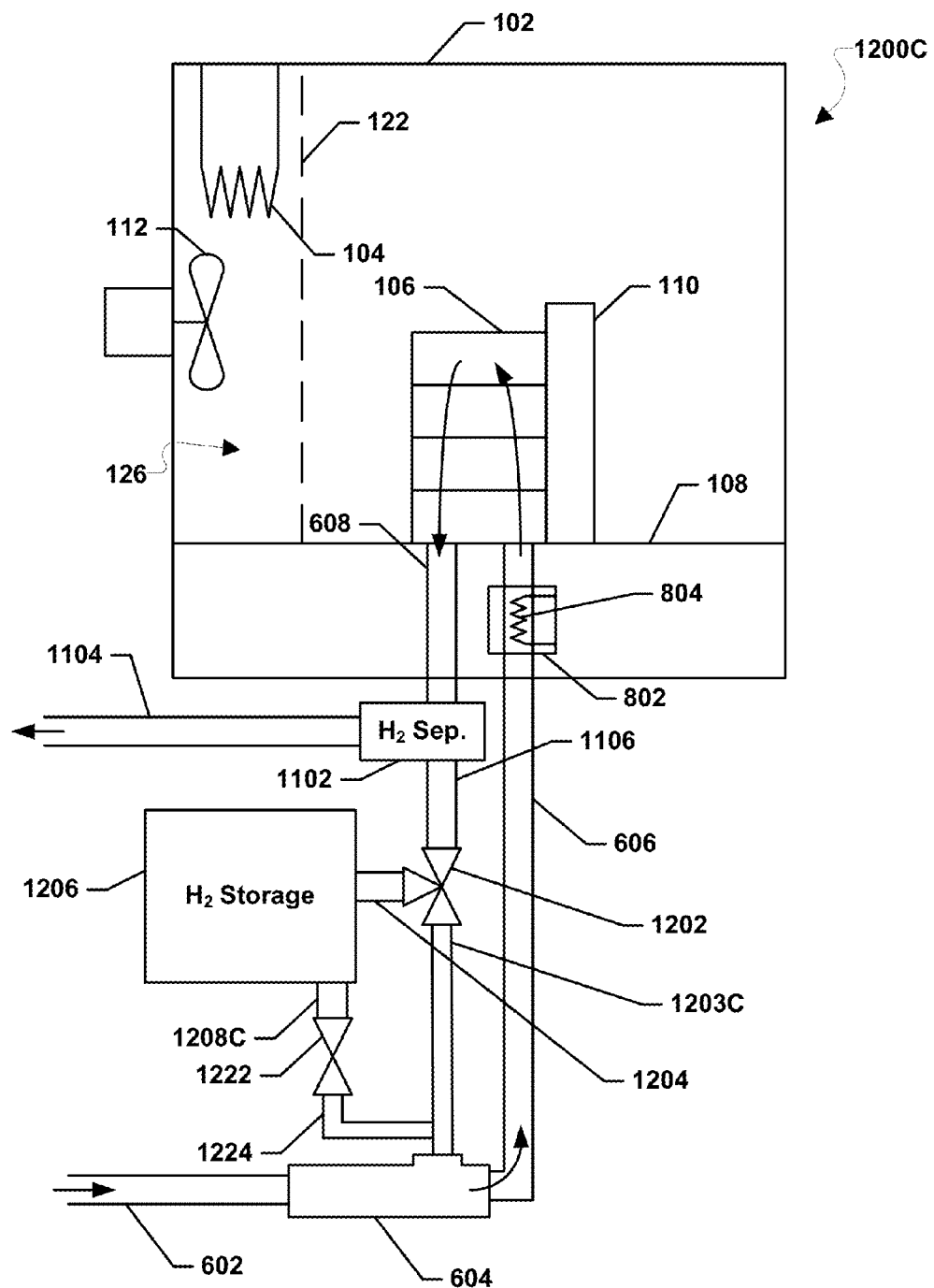

FIG. 12C illustrates a furnace 1200C according to another embodiment of the invention. The furnace 1200C is similar to furnace 1200A illustrated in FIG. 12A and contains a number of components in common. Those components which are common to both furnaces 1200A and 1200C are numbered with the same numbers in FIGS. 12A and 12C and will not be described further.

A difference between furnace 1200A and furnace 1200C is that in furnace 1200C the valve 1210 may be eliminated and valve 1222 may be used. As an example, valve 1222 may be a two way valve. Hydrogen conduit 1203C may be coupled to one valve 1202 output and to a suction inlet of the eductor 604. The hydrogen storage tank 1206 output may be coupled to hydrogen conduit 1208C, and hydrogen conduit 1208C may be coupled to one of the inputs of valve 1222. The valve 1222 output may be coupled to hydrogen conduit 1224 which may be coupled to hydrogen conduit 1203C.

In operation the hydrogen separator 1102 may separate hydrogen from the fuel exhaust stream and the separated hydrogen may pass via hydrogen conduit 1106 to the valve 1202. The operation of valve 1202 may be controlled by an operator of the furnace 1200C or a furnace 1200C controller to send the hydrogen to the hydrogen storage tank 1206 via hydrogen conduit 1204 and/or to send hydrogen to hydrogen conduit 1203C. In this manner, all the separated hydrogen may be sent to storage, none of the separated hydrogen may be stored, or a percentage of the separated hydrogen may be stored and a percentage sent to hydrogen conduit 1203C. Hydrogen conduit 1203C may pass the received hydrogen to a suction inlet of the eductor 604, thereby recycling hydrogen into the inlet fuel stream. Hydrogen sent to the hydrogen storage tank 1206 via hydrogen conduit 1204 may be stored for later use in the furnace 1200C. Valve 1222 may be controlled to allow hydrogen from hydrogen conduit 1208C to enter hydrogen conduit 1224 and thereby pass to hydrogen conduit 1203C and then to a suction inlet of the eductor 604. In this manner, the higher pressure motive fuel through the eductor 604 may draw the lower pressure hydrogen from the hydrogen storage tank 1206 via hydrogen conduit 1208C and hydrogen conduit 1224 thereby utilizing the stored hydrogen in the fuel inlet stream which may reduce the need for additional hydrogen and reduce overall fuel consumption.

Figure 13:
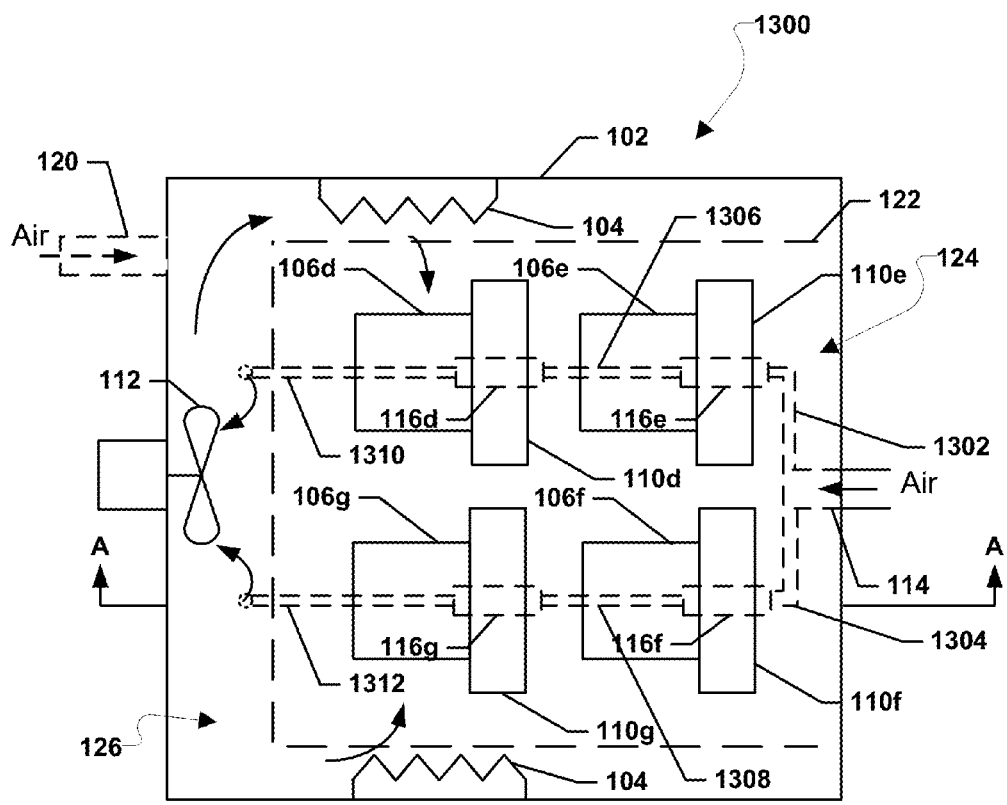
FIG. 13 is a schematic top view of a furnace for heating a fuel cell stack according to an embodiment of the present invention.

FIG. 13 illustrates a top view of a furnace 1300 according to an embodiment of the invention. The furnace 1300 is similar to furnace 100 illustrated in FIG. 1A and contains a number of components in common. Those components which are common to both furnaces 100 and 1300 are numbered with the same numbers in FIGS. 1A and 13 and will not be described further.

One difference between furnaces 100 and 1300 is that the base of furnace 1300 is configured to support a plurality of fuel cell stacks 106d, 106e, 106f, and 106g. An additional difference is there are four eductors 116d, 116e, 116f, and 116g in the furnace 1300, each coupled to an air bucket 110d, 110e, 110f, and 110g, respectively. Another difference is that the air supply conduit 114 diverges into two air supply conduits 1302 and 1304. Air supply conduit 1302 may be coupled to a motive inlet of eductor 116e. A suction inlet of eductor 116e may be coupled to air bucket 110e. A discharge outlet of eductor 116e may be coupled to an air conduit 1306. Air conduit 1306 may be coupled to a motive inlet of eductor 116d. A suction inlet of eductor 116d may be coupled to air bucket 110d. A discharge outlet of eductor 116d may be coupled to air input conduit 1310. Air input conduit 1310 may be configured to provide air into the air heating chamber 126. Air supply conduit 1304 may be coupled to a motive inlet of eductor 116f. A suction inlet of eductor 116f may be coupled to air bucket 110f. A discharge outlet of eductor 116f may be coupled to an air conduit 1308. Air conduit 1308 may be coupled to a motive inlet of eductor 116g. A suction inlet of eductor 116g may be coupled to air bucket 110g. A discharge outlet of eductor 116g may be coupled to air input conduit 1312. Air input conduit 1312 may be configured to provide air into the air heating chamber 126.

In an alternative embodiment, furnace 1300 may have one air supply conduit connected to all four fuel cell stacks 106d, 106e, 106f, and 106g. In another alternative embodiment, furnace 1300 may have four separate air supply conduits, each connected to one stack 106d, 106e, 106f, or 106g.

Figure 14:
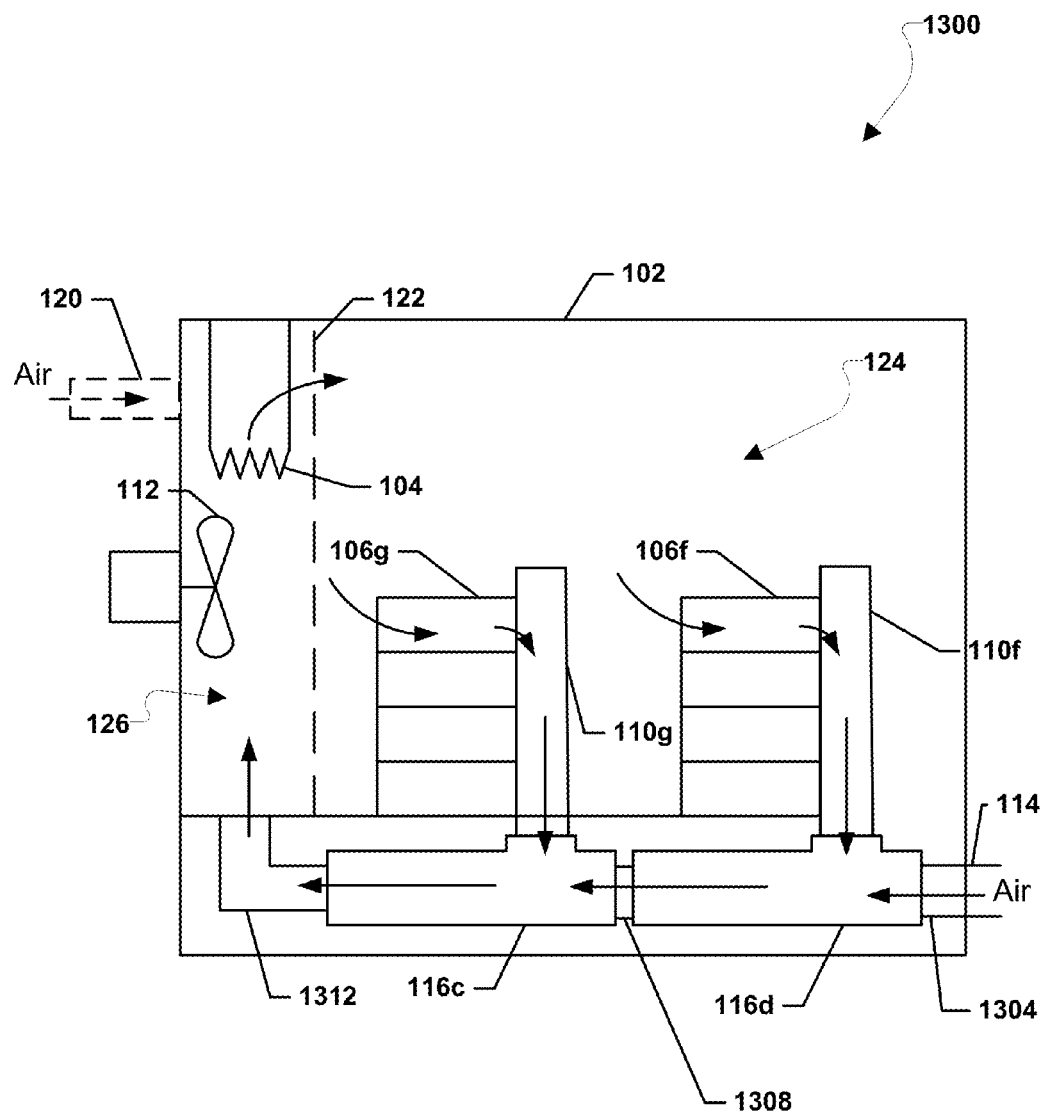
FIGS. 14-16 are a schematic side cross sectional views of furnaces for heating a fuel cell stack according to embodiments of the present invention.

FIG. 14 illustrates a side cross sectional view of furnace 1300 along line A-A in FIG. 13. In operation furnace 1300 may operate in a similar manner as furnace 100 described above with reference to FIG. 1A, except that air from the furnace working area 124 may be recycled through all the fuel cell stacks 106a, 106b, 106c, and 106d, rather than just a single fuel cell stack 106. One of skill in the art will appreciate that while discussed in reference to air recycling, they may be used for fuel and/or fuel and air recycling and that all of the embodiments discussed in the present application for utilizing both air and fuel eductors may be applicable to furnaces used to sinter and/or condition a plurality of fuel cell stacks as well.

Figure 15:
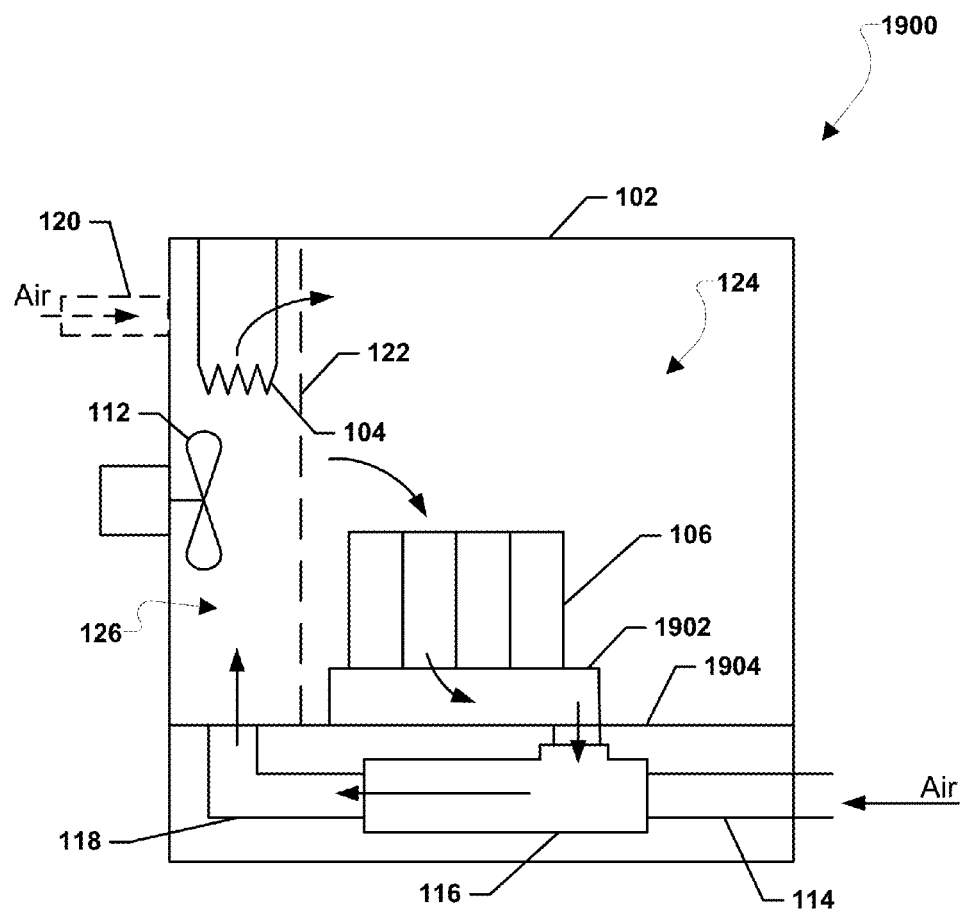

FIG. 15 illustrates a furnace 1900 according to another embodiment of the invention. The furnace 1900 is similar to furnace 100 illustrated in FIG. 1A and contains a number of components in common. Those components which are common to both furnaces 100 and 1900 are numbered with the same numbers in FIGS. 1A and 15, and these components will not be described further.

One difference between furnaces 100 and 1900 is that in furnace 1900, the base 1904 may be configured to support the fuel cell stack 106 in a horizontal configuration. Air bucket 1902 may be configured to draw air in a vertical direction from the top of the furnace 1900 down through the fuel cell stack 106. In an alternative embodiment, flow baffles may also blow air from the bottom of the furnace up through the stacks in a vertical direction.

Figure 16:
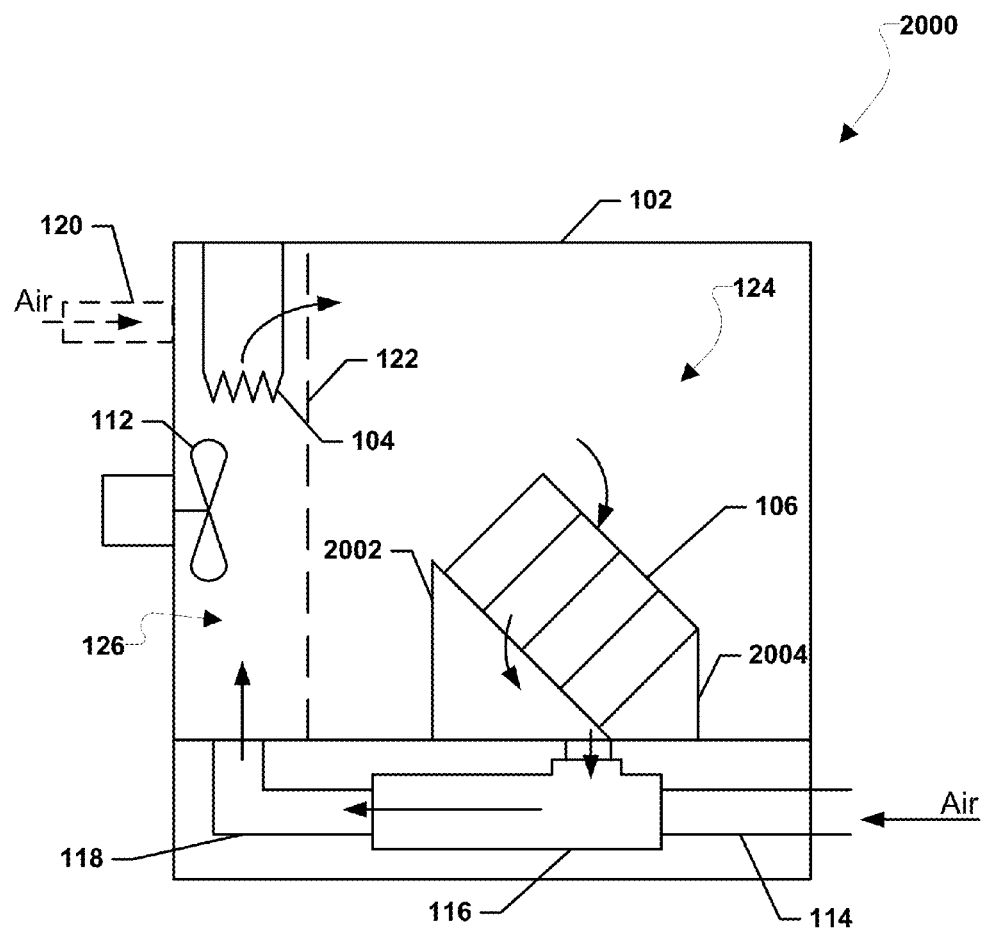

FIG. 16 illustrates a furnace 2000 according to an embodiment of the invention. The furnace 2000 is similar to furnace 1900 illustrated in FIG. 15 and contains a number of components in common. Those components which are common to both furnaces 1900 and 2000 are numbered with the same numbers in FIGS. 15 and 16 and will not be described further.

One difference between furnaces 1900 and 2000 is that in furnace 2000 the base 2004 may be configured to support the fuel cell stack 106 at an angle. The angle may be any angle, such as 45 degrees. Air bucket 2002 may be configured to draw air from the angled fuel cell stack 106. A support 2004 may be configured to support the fuel cell stack 106 in the furnace at any angle, such as 45 degrees.

In another embodiment, a furnace may be configured to condition a fuel cell stack substantially without externally supplied hydrogen (e.g., conditioning the stack while the anodes of the cells in the stack are in an ambient that contains less than 5 volume percent hydrogen, such as 1 volume percent or less hydrogen, preferably without any hydrogen being externally supplied to the anodes). As used herein, externally supplied hydrogen means separate hydrogen supplied to the furnace from sources outside the furnace, and does not include hydrogen generated by the operation of the furnace and/or fuel cell stack or hydrogen naturally present in air. Preferably, the conditioning also occurs substantially without a hydrocarbon fuel being provided to the anode electrodes. The conditioning includes both reducing metal oxide to metal in the anode electrodes of the cells in the stack and characterizing the stack.

In an embodiment, the anodes may be reduced electrochemically. An example of electrochemical reduction (ECR) is provided in U.S. Pat. No. 7,514,166 issued on Apr. 7, 2009, titled "REDUCTION OF SOFC ANODES TO EXTEND STACK LIFETIME", and incorporated herein by reference in its entirety.

In ECR, a humid gas, preferably a gas other than hydrogen or hydrocarbon fuel gas is provided to the anode electrode of the fuel cells in the stack. For example, an inert gas, such as nitrogen may be flowed through a humidifier to pick up moisture, and may be directed to the anode, while any gas, such as air, may be flowed to the cathode.

The electrochemical reduction includes applying an external voltage to each fuel cell in the stack in a reverse current direction. In other words, the load leads from the power supply are reversed in the reduction process, such that the positive lead is connected to the stack to be electrically connected to the cathode and the negative lead is connected to the stack to be electrically connected to the anode. Any suitable power supply may be used, such as a large battery, a battery array and/or a power supply which is connected to a power grid. Thus, during the reduction process, a voltage is applied to the fuel cell and the fuel cells in the stack operate in a mode similar to a solid oxide reversible fuel cell's electrolysis mode.

The application of the voltage in a reverse current direction creates a strong reducing environment on the anode side of the fuel cells to drive oxygen from the nickel oxide on the anode to the cathode, and may thereby reduce the anode to nickel. As oxygen from the $NiO_x$ may be consumed, further oxygen to support the current may come from water (e.g., from the humid inert gas) electrolyzed at the anode. In this manner, ECR may result in complete reduction of the anode, and ECR may require no hydrogen flow to the fuel cell stack. The elimination of the need for hydrogen in the conditioning facility may lower cost of fuel cell stack production, increase the reliability of the fuel cell stacks, ease expansion, and enable a more rapid conditioning of the fuel cell stacks.

In an embodiment, the stack characterization portion of the conditioning process includes one or more of stack fuel utilization measurement, indentifying physical defects in the stack, such as cracked cells and/or leaking seals, and electrical characterization of each cell in the stack. Preferably, the characterization includes any two, and more preferably, all three of the above steps.

The fuel utilization measurement may be performed during conditioning by running the fuel cell stack at steady state on a fuel, such as hydrogen and air, varying the fuel flow rate, and evaluating the ability of the stack to maintain output power at lower, near stoichiometric flows (e.g., high fuel utilization). In another embodiment, fuel utilization measurement during conditioning may be performed without hydrogen or hydrocarbon fuel. In an embodiment, during ECR the flow of anode gas (e.g., nitrogen) may be varied while the fuel cell stack performance may be monitored. As the fuel flow is varied, the ability of the fuel cell stack to maintain output power at lower, near stoichiometric flows (e.g., high fuel utilization) may be evaluated. In an alternative embodiment, during ECR the dewpoint in the anode gas may be varied while the fuel cell stack performance may be monitored.

In the various embodiments open circuit voltage fuel cell sensors (OCVFS), such as the OCVFSs described in U.S. Patent Publication No. 2008/0124590 titled "Fuel cell systems with fuel utilization and oxidation monitoring", herein incorporated by reference in its entirety, may be used with the furnaces and fuel cell stacks to monitor fuel cell open circuit voltage (OCV).

In another embodiment, fuel utilization may be measured by measuring the inlet and outlet voltage. The cell voltage load may vary from the area of the cell near the inlet to areas of the cell near the exhaust where hydrogen may be depleted. The voltage drop from the inlet to the outlet may be highest for cells that have the poorest fuel utilization. In an embodiment, adding a second set of voltage probes to the outlet may provide a more sensitive indication of the fuel utilization.

In another embodiment, an OCV cell may be electrically isolated from the fuel cell stack but the OCV cell may remain in fluid contact with the same fuel stream as the fuel cells under load. In this manner the OCV cell may be used to measure the hydrogen content of the anode stream. In an embodiment, an OCV cell may be built into every interconnect in the exhaust, and the OCV cell voltage may be monitored to indicate the hydrogen content at the exhaust of each cell.

In another embodiment the fuel utilization may be monitored by detecting current spikes and/or current interrupts. A stack undergoing a rapid increase in current draw may sustain current briefly, and then cells may decrease in voltage as hydrogen is consumed in the anode chamber of each cell. Cells with higher fuel utilization may maintain their voltage longer. In an embodiment current spikes may be monitored in tandem with high speed cell monitoring to quickly identify cells with poor fuel utilization. In an alternative embodiment, current interrupts may be used because the increase in voltage when the current is suddenly dropped may be slower for cells with poor utilization.

In the various embodiments, the physical defects in the stack, such as seal leaks or cracks in the cells may also be identified during conditioning. In an embodiment, leaks or cracks may be identified by monitoring open circuit voltage (OCV) of the stack in hydrogen and air. In another embodiment, leaks or cracks may be detected by measuring the moist (or dry) nitrogen/oxygen OCV before, during, or after ECR reduction of the anodes.

In another embodiment, leaks or cracks in the fuel cell stack may be detected by measuring the nitrogen/oxygen OCV while applying a higher pressure to the cathode air side than to the anode side. For example, leaks or cracks in the fuel cell stack may be detected by measuring the nitrogen/oxygen OCV while applying a partial vacuum to the anode side. In another embodiment, leaks or cracks in the fuel cell stack may be detected by modulating the anode or cathode pressure and sealing off the anode and/or cathode chambers, and monitoring the cell voltage decay.

In another embodiment, leaks or cracks in the fuel cell stack may be identified by, before beginning ECR, sealing off the anode chamber (e.g., isolating the anode sides of every cell from the ambient), applying a current to the stack thereby bringing the stack to a more positive voltage and pumping oxygen from the anode side to the cathode side to create an oxygen partial pressure on the order of $1 \times 10^{-10}$ atmospheres, such as $1 \times 10^{-10}$ atmospheres, such as less than $1 \times 10^{-10}$ atmospheres, on the anode side of each cell in the fuel cell stack. In this manner, after the current is shut off, leakage into the anode chamber may be detected by monitoring stack voltage decay as oxygen re-diffuses back to the anode side which may result in the stack voltage decaying to a smaller OCV value.

In the various embodiments, electrical characterization of each cell in the fuel cell stack may also be conducted during conditioning. In an embodiment, the fuel cell may be characterized by flowing hydrogen and air, drawing current from the fuel cell, and measuring the electrical parameters such as voltage or AC impedance. In another embodiment, electrical characterization of each cell in the fuel cell stack may be performed by measuring cell voltage and impedance at one or more frequencies, or a spectrum of frequencies (e.g., electrochemical impedance spectroscopy (EIS)), in either ECR mode, water electrolysis mode, or oxygen pumping mode.

In another embodiment, electrical characterization of each cell in the fuel cell stack may be performed by measuring the electrochemical active area by cyclic voltammetry (CV), in which the potential may be cycled, and an electrode actively redoxed. CV may be performed before, after, or during the ECR process. In another embodiment, electrical characterization of each cell in the fuel cell stack may be performed in the cold or hot state with a hipot tester to determine the dielectric integrity between the anode and cathode. In another embodiment, electrical characterization of each cell in the fuel cell stack may be performed during the hot or cold state with a capacitance meter to measure capacitance, equivalent series resistance (ESR), and/or leakage current.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for heating a fuel cell stack, comprising:
   placing the fuel cell stack in a furnace, wherein the furnace comprises:
      a heat source;
      a base configured to support the fuel cell stack; and
      an eductor;
   operating the furnace to at least one of sinter or condition the fuel cell stack; and
   providing cooler, higher pressure air from an air input into a motive inlet of the educator to draw lower pressure, warmer air from the fuel cell stack through a suction inlet of the educator.

2. The method of claim 1, wherein the furnace further comprises:
   a fuel input.

3. The method of claim 1, further comprising:
   mixing the cooler and warmer air in a converging portion of the eductor.

4. The method of claim 1, further comprising:
evacuating air from a discharge outlet of the eductor away from the furnace.

5. The method of claim 1, further comprising:
recycling at least a portion of the air from the fuel cell stack into an air inlet stream of the furnace through a discharge outlet of the eductor.

6. The method of claim 5, wherein the eductor is located in a hot zone of the furnace.

7. The method of claim 5, wherein the eductor is located outside a hot zone of the furnace.

8. The method of claim 7, further comprising pre-heating the air inlet stream.

9. The method of claim 5, further comprising pre-heating the air inlet stream before it enters the eductor.

10. The method of claim 1, wherein the eductor is a Venturi eductor.

11. The method of claim 1, wherein the eductor is one of a plurality of eductors, and wherein the fuel cell stack in the furnace comprises one of a plurality of fuel cell stacks placed into the furnace.

12. The method of claim 1, wherein placing the fuel cell stack in a furnace comprises placing the fuel cell stack in the furnace at an angle of 0-90 degrees.

13. The method of claim 1, further comprising monitoring a power consumption of the furnace.

14. The method of claim 1, further comprising monitoring a temperature of air within the furnace.

15. The method of claim 1, wherein the conditioning comprises electrochemically reducing the anode electrodes followed by characterizing the stack without externally supplied hydrogen.

16. The method of claim 1, further comprising conditioning the fuel cell stack without externally supplied hydrogen.

17. The method of claim 1, further comprising:
operating a circulation fan to mix air within the furnace.

18. The method of claim 1, wherein operation the furnace to at least one of sinter or condition the fuel cell stack comprises operating the furnace to sinter the fuel cell stack.

19. The method of claim 1, wherein operating the furnace to at least one of sinter or condition the fuel cell stack comprises operating the furnace to condition the fuel cell stack.

20. The method of claim 1, wherein operation the furnace to at least one of sinter or condition the fuel cell stack comprises operating the furnace to sinter the fuel cell stack.

21. A method for heating a fuel cell stack, comprising:
placing the fuel cell stack in a furnace, wherein the furnace comprises:
a heat source;
a base configured to support the fuel cell stack; and
an eductor;
operating the furnace to at least one of sinter or condition the fuel cell stack; and
providing a lower temperature, higher pressure fuel stream into a motive inlet of the eductor to draw higher temperature, lower pressure stack fuel exhaust through a suction inlet of the eductor to recycle a mixed fuel and fuel exhaust into a fuel inlet stream of the fuel cell stack, wherein the eductor is located in a hot zone of the furnace or outside the hot zone of the furnace.

22. The method of claim 21, wherein the eductor is located outside the hot zone of the furnace.

23. The method of claim 21, wherein the eductor is located in the hot zone of the furnace.

24. A method for heating a fuel cell stack, comprising:
placing the fuel cell stack in a furnace, wherein the furnace comprises:
a heat source;
a base configured to support the fuel cell stack; and
an eductor;
operating the furnace to at least one of sinter or condition the fuel cell stack;
providing a lower temperature, higher pressure fuel stream into a motive inlet of the eductor to draw higher temperature, lower pressure stack fuel exhaust through a suction inlet of the eductor to recycle a mixed fuel and fuel exhaust into a fuel inlet stream of the fuel cell stack; and
pre-heating the fuel inlet stream before it enters the fuel cell stack.

* * * * *